United States Patent [19]

Fant

[11] Patent Number: 4,835,532

[45] Date of Patent: May 30, 1989

[54] NONALIASING REAL-TIME SPATIAL TRANSFORM IMAGE PROCESSING SYSTEM

[75] Inventor: Karl M. Fant, Minneapolis, Minn.

[73] Assignee: Honeywell Inc., Minneapolis, Minn.

[21] Appl. No.: 175,638

[22] Filed: Mar. 29, 1988

Related U.S. Application Data

[63] Continuation of Ser. No. 788,652, Oct. 14, 1985, abandoned, which is a continuation of Ser. No. 403,391, Jul. 30, 1982, abandoned.

[51] Int. Cl.⁴ .............................................. G09G 1/00
[52] U.S. Cl. ................................... 340/728; 340/747; 340/980; 382/44
[58] Field of Search ............... 340/728, 723, 727, 980; 364/515, 521; 358/104, 231; 434/40-44, 22, 30, 38

[56] References Cited

U.S. PATENT DOCUMENTS

| | | | |
|---|---|---|---|
| 3,976,982 | 8/1976 | Elselen | 340/727 X |
| 4,152,766 | 5/1979 | Osofsky et al. | 364/515 |
| 4,179,823 | 12/1979 | Sullivan et al. | 35/10.24 |
| 4,179,824 | 12/1979 | Marsh | 35/10.24 |
| 4,181,953 | 1/1980 | Osofsky | 364/515 |
| 4,199,875 | 4/1980 | Barbarasch | 35/12 N |
| 4,208,719 | 6/1980 | Lotz et al. | 364/515 |
| 4,208,810 | 6/1980 | Rohner et al. | 35/10.24 |
| 4,213,252 | 7/1980 | Sullivan et al. | 35/10.24 |
| 4,229,797 | 10/1980 | Ledley | 364/515 |
| 4,263,726 | 4/1981 | Bolton | 434/43 |
| 4,343,037 | 8/1982 | Bolton | 434/43 X |
| 4,471,349 | 9/1984 | Strolk | 340/728 X |
| 4,566,002 | 1/1986 | Miura et al. | 340/727 |

OTHER PUBLICATIONS

Spatial Transformation Techniques; T. D. S. Duff, I.E.E.E. Computer Graphics and Applications, vol. 6 #3, Mar. 1986, pp. 66-67.

James F. Blinn and Martin E. Newell, University of Utah, "Texture and Reflection in Computer Generated Images", *Communication of the Association for Computing Machinery, Inc.*, vol. 19, No. 10, Oct. '76, pp. 542-546.

Ed Catmull and Alvy Ray Smith, Lucasfilm Ltd., San Anselmo, CA, "3-D Transformations of Images in Scanline Order", permission by ACM, 1980, pp. 279-285.

Edwin Catmull, "A Subdivision Algorithm for Computer Display of Curved Surfaces", UTEC-CSc-74-133, Dec. '74, pp. 35-38.

*Primary Examiner*—Marshall M. Curtis
*Attorney, Agent, or Firm*—C. G. Mersereau; W. B. Easton

[57] ABSTRACT

The disclosure relates to a computer controlled imaging system involving a digital image processing and display system which has the ability to compose and construct a display scene from a library of images with sufficient processing speed to permit real-time or near real time analysis of the images by a human operator or a hardware/software equivalent thereof. An unique method of mapping a digital input image to a viewing plane in both linear and perspective modes is disclosed.

9 Claims, 36 Drawing Sheets

SUN ANGLE TABLE

| SECTOR | SUN ANGLE (DEGREES) | |
|---|---|---|
| | AZIMUTH | ELEVATION |
| 1 | 72-89 | 50-65 |
| 2 | 89-102 | 50-65 |
| 3 | 102-140 | 50-65 |
| . | | |
| . | | |
| N | ... | ... |

| | | |
|---|---|---|
| A | $R_V$ OCCLUDES $R_T$ | $R_{V_1}$ CLOSEST TO $R_T$ |
| B | $R_V$ OCCLUDES $R_T$ | $R_{V_1}$ CLOSEST TO $R_T$ |
| C | NO OCCLUSION | $R_{V_1}, R_{V_2}$ EQUAL DIST. FROM $R_T$ |
| D | $R_T$ OCCLUDES $R_{V_2}$ | $R_{V_2}$ CLOSEST TO $R_T$ |
| E | $R_T$ OCCLUDES $R_{V_2}$ | $R_{V_2}$ CLOSEST TO $R_T$ |

EYE COORDINATES EXPRESSED IN WORLD SYSTEM COORDINATES $t_x = X$    $\theta$ = YAW
$t_y = Y$    $\phi$ = PITCH
$t_z = Z$    $\psi$ = ROLL

| | | | |
|---|---|---|---|
| $V_{11} = -\cos\theta \cdot \cos\psi - \sin\theta \cdot \sin\phi \cdot \sin\psi$ | $V_{12} = \cos\theta \cdot \sin\psi - \sin\theta \cdot \sin\phi \cdot \cos\psi$ | $V_{13} = -\sin\theta \cdot \cos\phi$ | |
| $V_{21} = \sin\theta \cdot \cos\psi - \cos\theta \cdot \sin\phi \cdot \sin\psi$ | $V_{22} = -\sin\theta \cdot \sin\psi - \cos\theta \cdot \sin\phi \cdot \cos\psi$ | $V_{23} = -\cos\theta \cdot \cos\phi$ | |
| $V_{31} = -\cos\phi \cdot \sin\psi$ | $V_{32} = -\cos\phi \cdot \cos\psi$ | $V_{33} = \sin\phi$ | |
| $V_{41} = \cos\phi \cdot (t_x \cdot \cos\theta - t_y \cdot \sin\theta) + \sin\psi \cdot (t_x \cdot \sin\theta \cdot \sin\phi + t_y \cdot \cos\theta \cdot \sin\phi + t_z \cdot \cos\phi)$ | $V_{42} = \cos\psi \cdot (t_x \cdot \sin\theta \cdot \sin\phi + t_y \cdot \cos\theta \cdot \sin\phi + t_z \cdot \cos\phi) - \sin\psi \cdot (t_x \cdot \cos\theta - t_y \cdot \sin\theta)$ | $V_{43} = t_x \cdot \sin\theta \cdot \cos\phi + t_y \cdot \cos\theta \cdot \cos\phi - t_z \cdot \sin\phi$ | |

V CONTAINS $\begin{matrix} V_{11} & V_{12} & V_{13} & & \\ V_{21} & V_{22} & V_{23} & & \sin\psi \\ V_{31} & V_{32} & V_{33} & & \cos\psi \\ V_{41} & V_{42} & V_{43} & & \end{matrix}$

FIG. 29

```
BANK 1  ———
BANK 2  — — — —
BANK 3  —•—•
BANK 4  —·—·
```

|  | | | | | | |
|---|---|---|---|---|---|---|
| IMAGE FORMAT | 1,1<br>2,1<br>3,1<br>4,1<br>⋮<br>512,1 | 1,2<br>2,2<br>3,2<br>4,2<br>⋮<br>512,2 | 1,3<br>2,3<br>3,3<br>4,3<br>⋮<br>512,3 | 1,4<br>2,4<br>3,4<br>4,4<br>⋮<br>512,4 | ⋯<br>⋯<br>⋯<br>⋯<br>⋯<br>⋯ | 1,512<br>2,512<br>3,512<br>4,512<br>⋮<br>512,512 |

MAPPING OF IMAGE INTO 4 MEMORY BANKS SUCH THAT ANY FOUR CONSECUTIVE PIXELS OF ANY ROW OR COLUMN ALL RESIDE IN DIFFERENT BANKS AND CAN BE ACCESSED SIMULTANEOUSLY

FIG. 38

| ADDRESS | BANK A | BANK B | BANK C | BANK D |
|---|---|---|---|---|
| 0 | 1,1 | 1,2 | 1,3 | 1,4 |
| 1 | 2,4 | 2,1 | 2,2 | 2,3 |
| 2 | 3,3 | 3,4 | 3,1 | 3,2 |
| 3 | 4,2 | 4,3 | 4,4 | 4,1 |
| 4 | 5,1 | 5,2 | 5,3 | 5,4 |
| 5 | 6,4 | 6,1 | 6,2 | 6,3 |
| 6 | 7,3 | 7,4 | 7,1 | 7,2 |
| 7 | 8,2 | 8,3 | 8,4 | 8,1 |
| ⋮ | ⋮ | ⋮ | ⋮ | ⋮ |
| 512 | 1,5 | 1,6 | 1,7 | 1,8 |
| 513 | 2,8 | 2,5 | 2,6 | 2,7 |
| 514 | 3,7 | 3,8 | 3,5 | 3,6 |
| 515 | 4,6 | 4,7 | 4,8 | 4,5 |
| ⋮ | ⋮ | ⋮ | ⋮ | ⋮ |
| 1024 | 1,9 | 1,10 | 1,11 | 1,12 |
| 1025 | 2,12 | 2,9 | 2,10 | 2,11 |
| ⋮ | ⋮ | ⋮ | ⋮ | ⋮ |
| 65023 | 1,509 | 1,510 | 1,511 | 1,512 |
| ⋮ | ⋮ | ⋮ | ⋮ | ⋮ |
| 65532 | 509,509 | 509,510 | 509,511 | 509,512 |
| 65533 | 510,512 | 510,509 | 510,510 | 510,511 |
| 65534 | 511,511 | 511,512 | 511,509 | 511,510 |
| 65536 | 512,510 | 512,511 | 512,512 | 512,509 |

ORIGINAL GRID

INTERMEDIATE LINEAR

INTERMEDIATE PERSPECTIVE

FINAL LINEAR

FINAL PERSPECTIVE

LINEAR

PERSPECTIVE $$\text{MRAY} = \frac{\text{SCREEN COORD}}{\text{SCREEN DIST}} \qquad \text{SLOPE OF VISION RAY}$$

$$Y = \text{MRAY} * Z \qquad \text{LINE EQUATION OF RAY}$$

$$\text{MOBJ} = \frac{Y_C - Y_D}{Z_C - Z_D} \qquad \text{SLOPE OF OBJECT LINE}$$

$$Y - Y_D = \text{MOBJ}(Z - Z_D) \qquad \text{LINE EQUATION OF OBJECT (CONSTANT)}$$

$$Z = \frac{Y_D - \text{MOBJ} * Y_D}{\text{MRAY} - \text{MOBJ}} \qquad \text{INTERCEPTION EQUATION}$$

$$\text{RATIO} = \frac{\text{INPUT COLUMN LENGTH}}{Z_D - Z_C} \qquad \text{RATIO OF HORIZONTAL SEGMENT TO CD SEGMENT}$$

$$\text{INSFAC} = (Z - \text{PREVZ}) * \text{RATIO} \qquad \text{LENGTH OF OBJECT LINE WHICH MAPS INTO NEXT SCREEN PIXEL}$$

FIG. 45

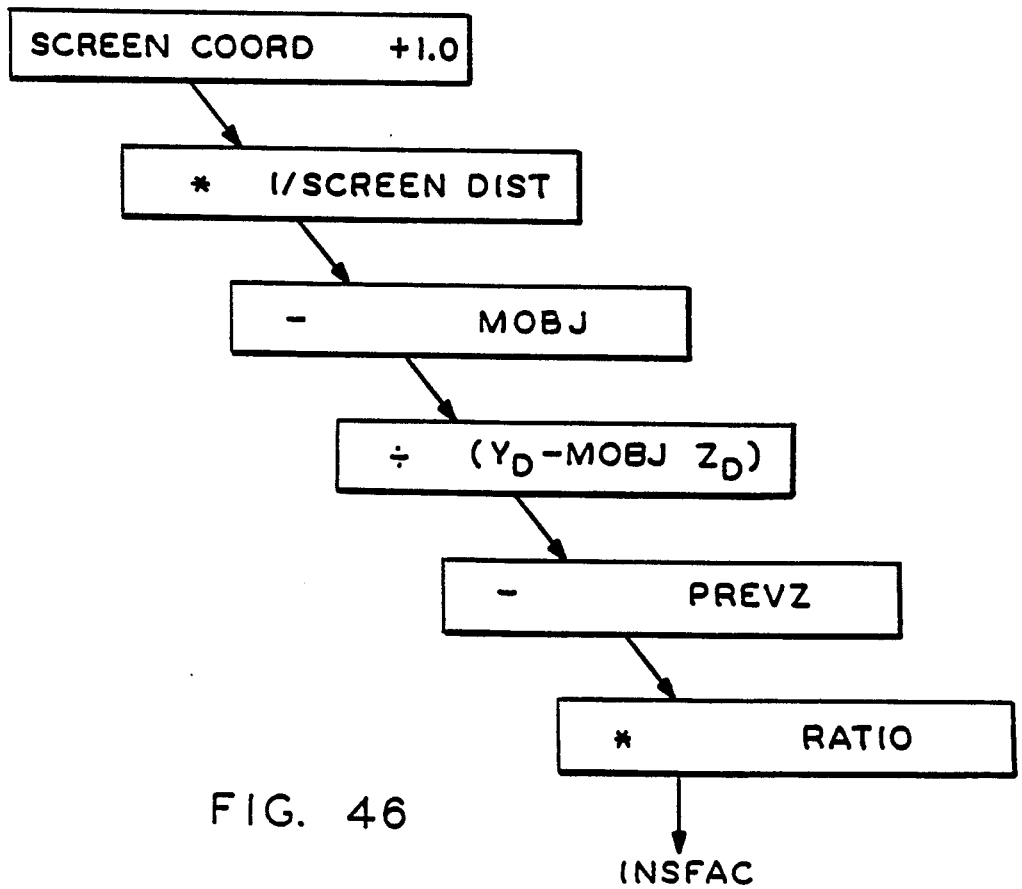

FIG. 46

FIRST PASS VERTICAL
OBJECT LINE PROJECTION

SECOND PASS HORIZONTAL
OBJECT LINE PROJECTION

NONALIASING REAL-TIME SPATIAL TRANSFORM IMAGE PROCESSING SYSTEM

This application is a continuation of applicaiton Ser. No. 788,652, filed Oct. 14, 1985, which is a continuation of application Ser. No. 403,391, filed July 30, 1982, both now abandoned.

BACKGROUND OF THE INVENTION

1. Field of the Invention

The invention relates generally to a computer controlled imaging system and, more particularly, to a digital image processing system which has the ability to compose and construct a sequential stream of scenes for a display from a library of images with sufficient processing speed to permit real-time or near real time analysis of the images by a human operator or a hardware/-software equivalent thereof.

One example of the many possible applications of such a system relates to the field of vehicle simulation such as aircraft flight simulation. In such a system a visual subsystem within the aircraft flight simulation system receives flight data from a flight simulation computer and terrain data from a defined or "gaming area" data base. A data processing system: within the visual simulation system organizes the flight data and terrain data to produce a simulated visual display as it would appear to an observer in the cockpit of the aircraft.

The visual system of a vehicle simulator which may be, for example, a helicopter simulator, involves a "window view of the simulated surroundings" and controls for guiding the "vehicle" in any desired direction relative to such surroundings. The term "window view" of the system herein is a display, normally in video form, of a simulated environment which corresponds to a terrain covering a large area which may be on the order of 25 to 100 square miles, for example. The simulated environment is referred to herein as a defined area or gaming area.

The operation of the controls of the vehicle guides the vehicle in, around and through the gaming area and it is the system response to the vehicle controls which determines what is seen in the window, that is, the video display. What is seen in the "window" is referred to as the field of view or FOV.

2. DESCRIPTION OF THE PRIOR ART

One system in the prior art known as "Computer Generated Imagery" (CGI) system utilizes a computer system to generate video displayable imagery from a data base. In the CGI system objects and surfaces for constructing video displayable scene are derived from purely mathematical models stored in the form of points which define the limits of the objects and surfaces.

The strength of CGI is in its surface representation. A real or artificial surface can be measured to get elevations at specified joints, usually at intersections of a uniform grid. The surface can be reconstructed in a computer by connecting sample elevations. In addition to realistic surface representation, CGI offers control over the placement of objects on the surface. Since the data of elevations is usually provided with a uniform grid, the placement of other objects can be specified on this same grid. Typical objects such as trees, rocks, shrubs, houses and roads can all have their positions defined in the data base grid system.

Correct illumination and perspective are also major contributions from CGI. Correct illumination is achieved by finding the surface normal for each pixel displayed. This normal is used along with line-of-sight and the normal from the illumination source, plus an ambient intensity and haze factors, to compute an intensity for a pixel. Correct perspective is achieved because the distance from the observation point to each surface point is known. This distance is a significant variable in the perspective transformation.

A weakness of CGI is lack of realism. Although an object can be accurately positioned, correctly illuminated and displayed in correct perspective, the object itself cannot be realistically presented. The current state of the art in CGI object presentation is such that objects appear overly cartoonish. Some scene elements, such as barren terrain, sand and clouds can be represented more realistically than highly structured objects like trees and grass or detailed man-made objects. Such detailed objects simply lack realism.

Another imaging system is conveniently referred to as "Computer Synthesized Imagers" or CSI. The CSI technology also generates images such as, for example video displayable images, from a data base but the objects and surfaces stored in its data base are represented as real-world electromagnetic media images of objects and surfaces rather than mathematical models thereof as in CGI.

Thus, whereas CGI uses a computer to generate imagery from a purely mathematical data base, CSI uses a computer to insert objects into a scene based on stored objects real-world images. Although CGI provides excellent control of a scene to be constructed and displayed for interaction in an environment, the fidelity is low and thus realism in the displayed scene is poor. CSI is just the opposite. Whereas fidelity is excellent, the control over scene construction is restricted.

The strength of CSI lies in its use of real images such as photographs in the scenes. With currently available video equipment the photographic data can be readily manipulated. Literally thousands of individual photographs can be stored on video disks, and access to them may be controlled by an indexing system just as is the case with digital data stored on magnetic disks. Moreover, the fidelity of the image is true and the outputted image is precisely the same as the inputted, stored image.

A weakness of CSI is that its scenes are limited to the view point of the "camera". That is, one cannot dynamically navigate a scene unless a series of through-the-scene photographs is used. For any reasonable size gaming area, the number of through-the-scene photographs may be prohibitive.

SUMMARY OF THE INVENTION

By means of the present invention the CGI system has been merged with newly developed CSI technology to form a "Computer Generated Synthesized Imagery" system which is referred to herein as a CGSI system. The invention herein involves combining the best of both technologies, CGI and CSI, to form CGSI. A scene is constructed by placing individual, normally detailed, objects with high fidelity (CSI) on a specified surface or background which may be CGI or CSI generated. A CGSI scene may be constructed much in the manner of a CGI scene with the surface elevations and object locations laid out on a uniform grid. The individual objects used in the scene are tailored for perspective, location and transformation including size, position, rotation, warp and intensity are performed on each image as required. The surface may be CGI texture or a series of CSI surface inserts. The scene is normally constructed by beginning with the objects most remote from the observation or scene recognition means and placing objects until the nearest objects have been placed. The CGSI scene may be constructed with imagery from any portion of the electromagnetic spectrum including visual, IR, MMW, radar, or the like.

It is, therefore, a main object of the invention to provide a new and improved computer generated imagery system involving the use of real-world images in the data base. Other objects of the invention will become apparent from the following specification, drawings and appended claims.

BRIEF DESCRIPTIONS OF THE DRAWINGS

In the drawings:

FIG. 29 is a list of the equations which define the positions of an observation or scene recognition system relative to the terrain coordinate system of the gaming area:

FIG. 38–40 show examples of how the image address to memory address is mapped;

FIG. 45 depicts the interception equation associating with the mapping of an image line on the screen as illustrated in FIG. 44;

FIG. 46 depicts a hardware pipeline performing the equations of FIG. 45;

DESCRIPTION OF A PREFERRED EMBODIMENT

Figure 1:
FIG. 1 is an aerial view of a battlefield area shown as an example of a defined or gaming area which could be represented in a data base in accordance with principles of the invention.

Referring to the drawings, FIG. 1 is an aerial view of a battlefield area which may be fictitious or may be an actual place anywhere in the world. The area shown by way of example has been referred to as a gaming area or defined area and, within the limits of practicality, would normally be an area covering on the order of 25 to 100 square miles.

If by way of example, the video display imagery system of the present invention were to be used for simulating the operation of a helicopter, a simulated gaming area such as that shown in FIG. 1 might be devised or selected as an environment for the operation of the helicopter. The visual system of the helicopter simulator would provide a continuous "window view" of the gaming area which could be a video display of a stream of pilot eye-view scenes in the gaming area corresponding to the location and attitude of the helicopter relative thereto. The helicopter simulator would be equipped with controls for guiding or navigating it in any direction in, around and through the gaming area in the manner of free flight. The system response to such controls determines what is seen in the video display "window".

Figure 2A:
FIGS. 2A and 2B illustrate scenes which might be somewhere in the defined area of FIG. 1 as it would appear for an instant on a video display simulating a window in the cockpit of a helicopter simulator.

FIG. 2A illustrates a scene which might be somewhere in the gaming area of FIG. 1, possibly behind a grove of trees, as it would appear for an instant on a video display simulating a window in the cabin of the helicopter simulator. The continued operation of the controls by a pilot trainee would define the dynamic movement of the helicopter in the gaming area and the scene on the video display would be in accordance with the instant-to-instant location of the helicopter.

Figure 2B:

FIGS. 2A and 2B are actual copies of photographic reproductions of screened video display scenes in a gaming area which were produced in accordance with the principles of the present invention. The decided realism in the detail of the objects despite the fact that the scene images have been through several processing steps which tend to reduce detail should be noted. In addition, the smooth transition from object to background illustrates the elimination of the cartoonish representations in the scene.

Figure 3:
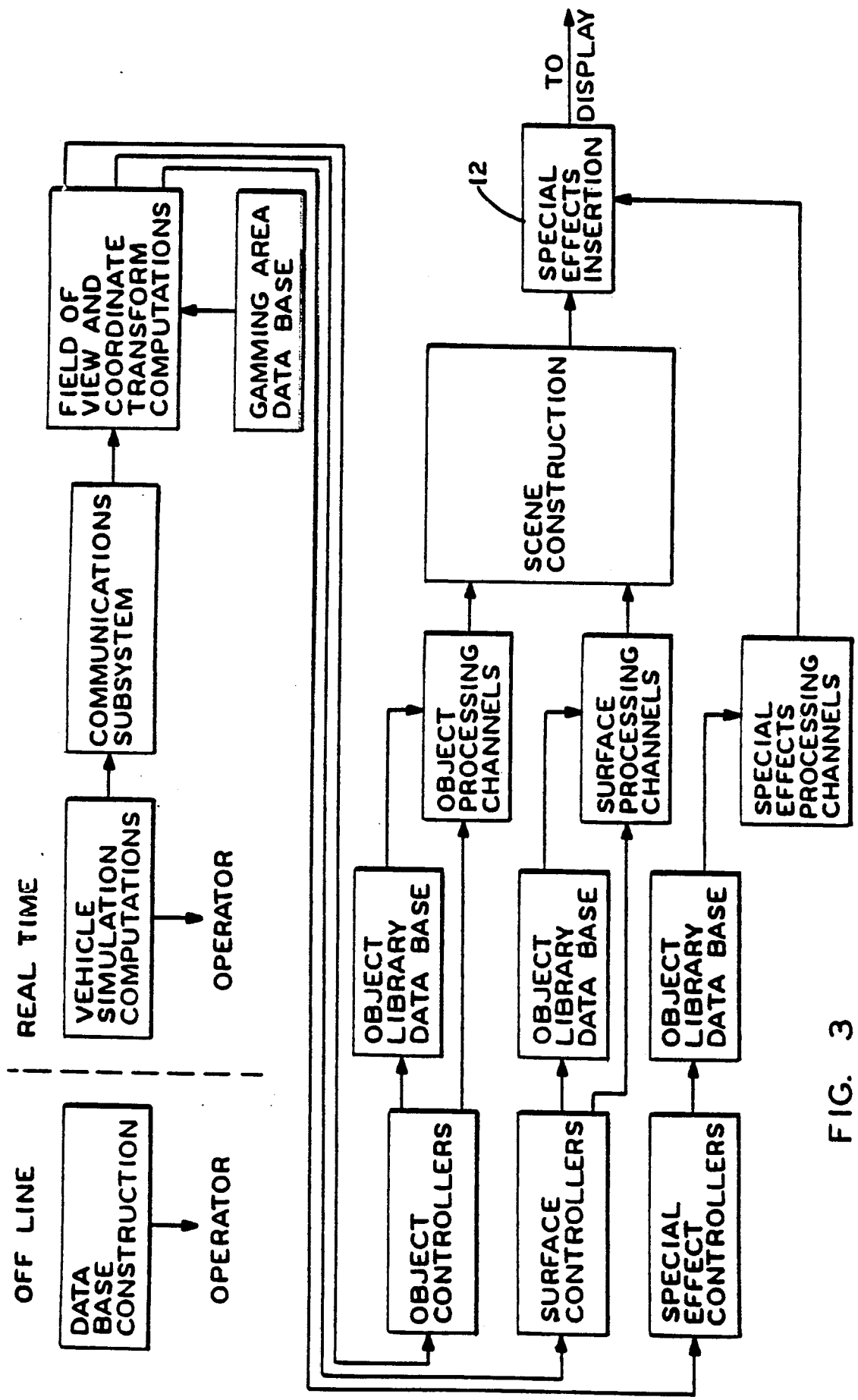
FIG. 3 is a block diagram outline of the CGSI system which embodies the invention.

FIG. 3 is a block diagram outline of the CGSI system and such diagram will be referred to frequently herein.

FIGS. 4 to 12 demonstrate steps in the construction of a typical CGSI scene which would culminate in the block 12 of the diagram of FIG. 3. These figures are also photographic reproductions of screened images.

The construction of a CGSI scene normally begins with the placement of land, water and sky surfaces. The sequence continues with the addition of objects, both small and large. The objects may be trees, rocks, bushes, houses, roads, lights, vehicles, helicopters, airplanes, animals, girls, etc. Finally, special effects may be added, if desired, and these may include smoke, dust, clouds, shadows, etc. To demonstrate how CGSI works, a sample scene is assembly in operations depicted in FIGS. 4 to 12.

Figure 4:
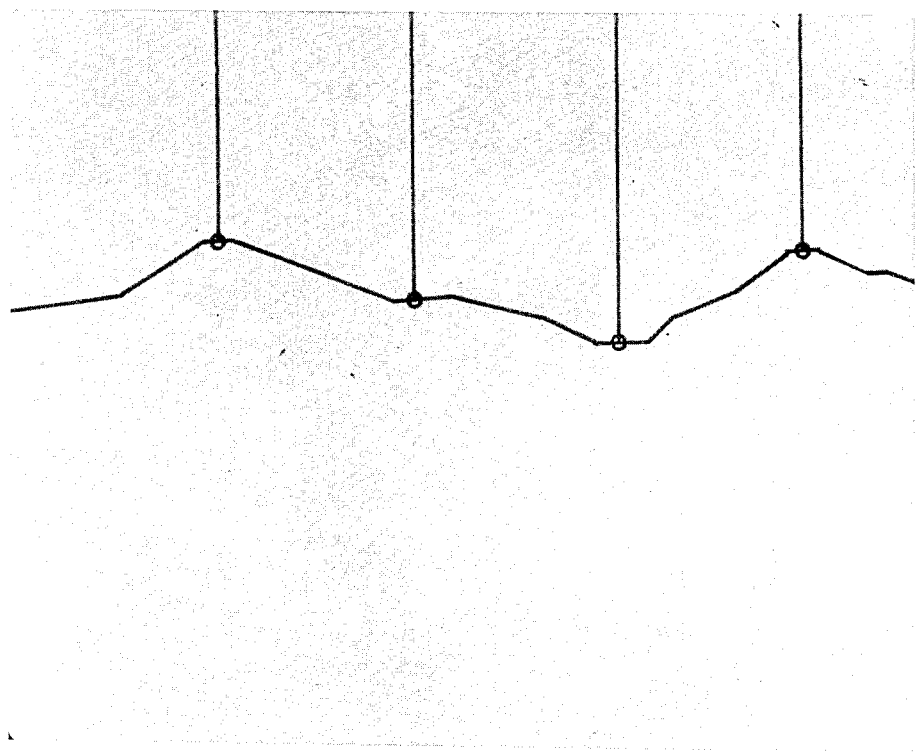
FIGS. 4 to 12 illustrate steps in the construction of a typical CGSI scene.

Beginning with FIG. 4, sky is added in segments over a distant background. Breaking the sky into segments, allows peaks and valleys to form the skyline as shown. In this example, the sky was broken into five segments. In general, the lower edge of the segment does not need to be straight, but may be curved or jagged to simulate rolling or sharp hills or mountains. An explanation of how the individual segments are warped based upon minimum and maximum data based elevations and upon viewpoint is described in detail later.

Figure 5:
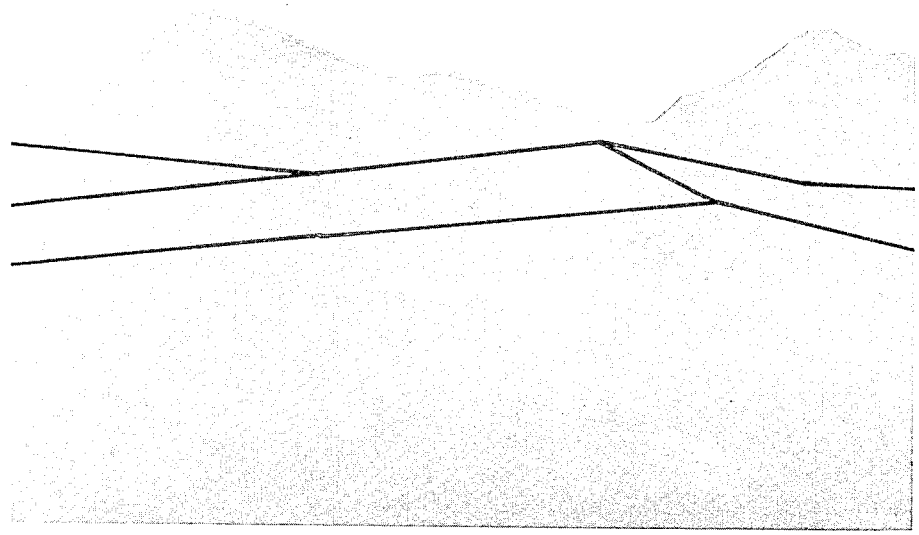

In FIG. 5, textured surfaces are added, also in segments, to form foreground and foothill surfaces. The untouched region between the foothills and the sky appears as mountains in the distant background. In ensuing figures, stored, textured surfaces, warped to fit the screen coordinates of the surface polygons, are then added to the scene. The intensity of each surface may be varied based upon range or other desired parameters.

Figure 6:

FIG. 6 illustrates a planned road segment for which a road representation in the data base surface library is warped to fit the screen coordinates. The surface library may contain different road surfaces and other special surfaces such as streams and ponds.

Figure 7:
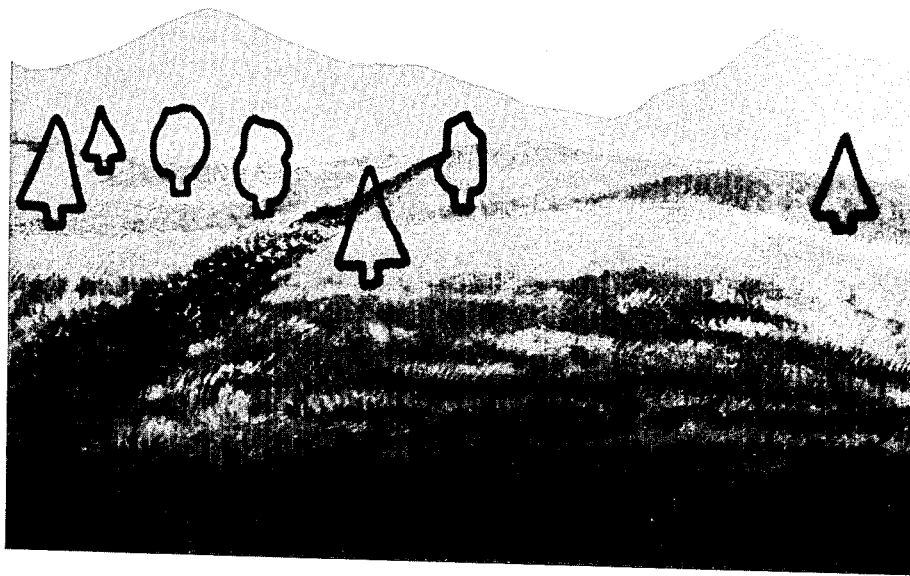

FIG. 7 shows examples of planned, relatively small two-dimensional (2D) objects which occupy less than a predetermined fraction of the total screen. In one embodiment objects occupying less than 1/16 of the scene's area were represented in 2D. This is because it has been demonstrated that in the majority of applications, such relatively small natural objects such as trees, bushes and rocks may be represented from one side, i.e., as 2D objects, with little loss of realism. Objects which cannot be represented from one side such as larger buildings, or items of special interest such as tanks, ships, etc. are referred to and represented as three-dimensional objects (3D). It will be appreciated that relatively small 2D objects may be processed by less extensive processing hardware/software than 3D objects and surfaces. During a flight through a scene, the 2D object may be handed off to a 3D processor when it occupies more than a preselected amount of the area of the scene.

Figure 8:
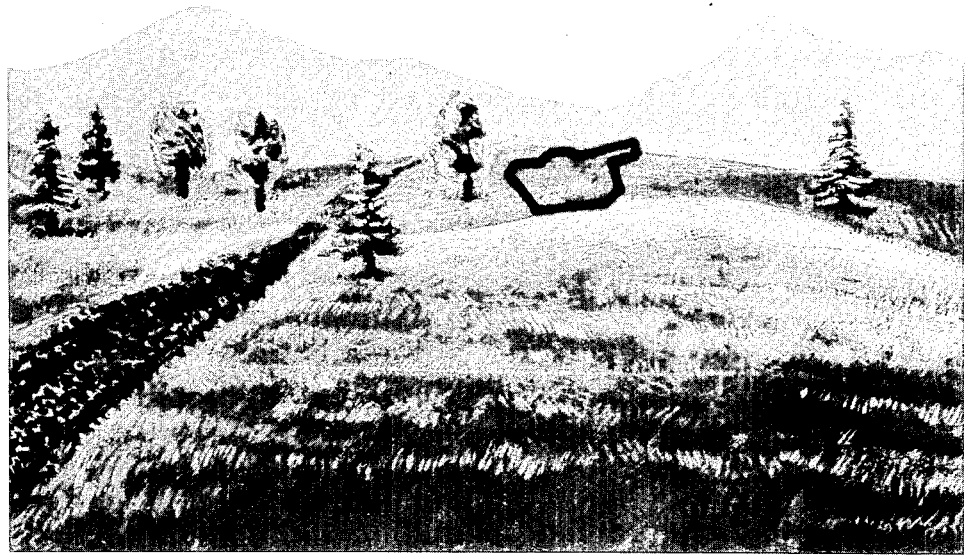

FIG. 8 illustrates a tank as a multi-view or 3D object. Multi-views of the tank are stored and the correct view, based upon the tank path, elevation and observer's viewpoint, is used in constructing the scene. The tank may be moving and may be very large.

Figure 9:
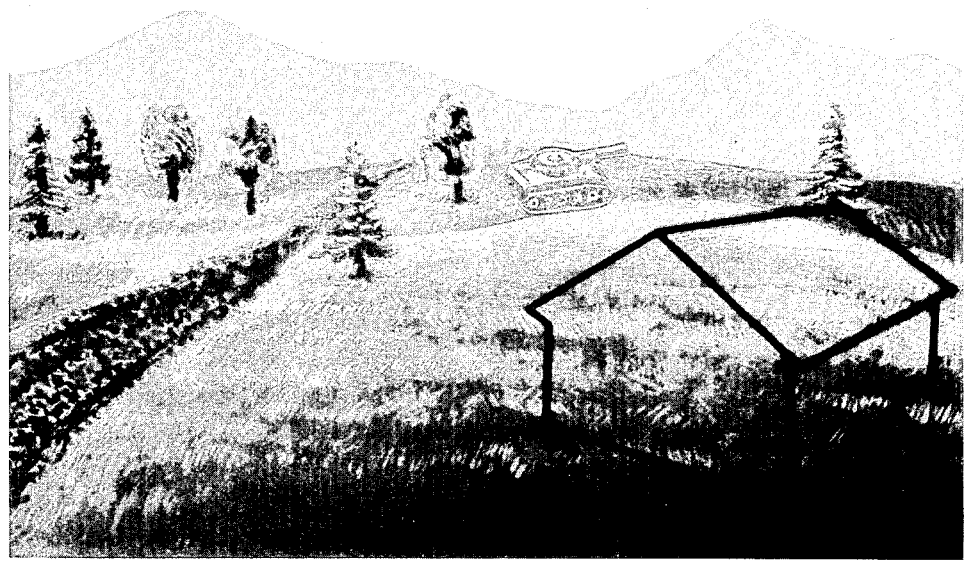

FIG. 9 illustrates a house which is an example of a multi-surface or 3D building. The house is separated into several surfaces, several roof segments (one if both sides are identical), two ends, and two sides. The individual surfaces of the house can be warped from a normalized view to form the perspective dictated by the screen coordinates and then joined together.

Figure 10:
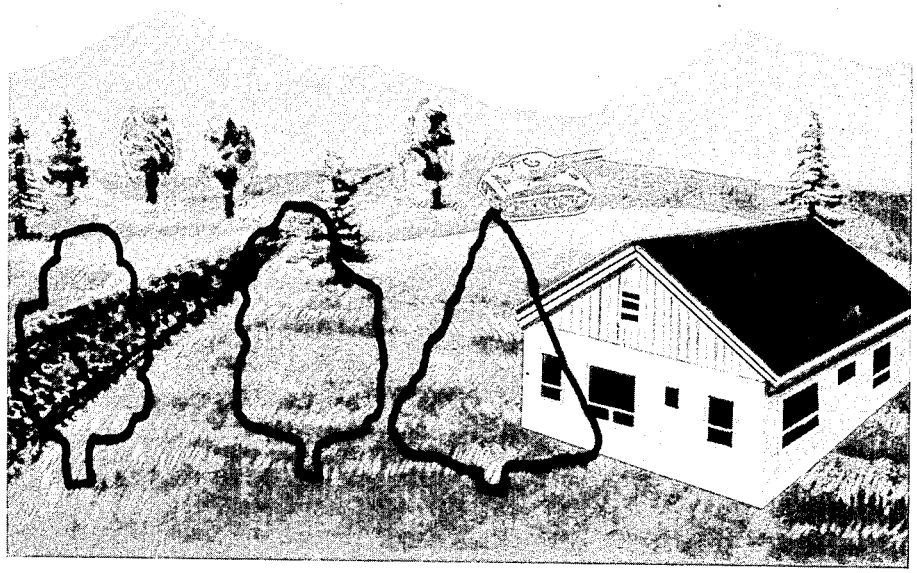

FIG. 10 illustrates large 2D objects which can occupy more than the predetermined amount of the area of the scene. When required, these objects may be expanded so that an object may be larger than the entire surface of the screen.

Figure 11:

FIG. 11 illustrates a special effects technique used for translucent media which include clouds, dust, smoke and shadows. A mask controls the transmission functions and a second input word controls the intensity and color.

Figure 12:

FIG. 12 illustrates a complete CGSI scene which might also appear somewhere in the gaming area illustrated in FIG. 1.

The block diagram of FIG. 3, will be addressed next. Each item thereof from the data base construction to the special effects insertion is described briefly immediately below and in greater detail in the ensuing text.

BRIEF DESCRIPTIONS OF ITEMS OF BLOCK DIAGRAM OF FIG. 3

DATA BASE CONSTRUCTION

The data base comprises two very different types of data which relate to the object library and the gaming area, respectively. The object library hardware produces and stores imagery with high fidelity on optical disks. The gaming area hardware is used to load the locations of objects, surfaces and special effects.

The flexibility of the object library is virtually unlimited. It may contain images of objects and surfaces, and transmissivity masks of special effects each of which may be represented in one of many bands of the electromagnetic radiation spectrum. This allows the simulation of not only the visual domain but also input/output based on sensed IR, MMW, radar, etc. The object library may also contain a mixture of 2D and 3D images. The images may represent a variety of day/night and diurnal conditions. The visual object library normally comprises photographic matter. In constructing high-fidelity objects from the object library, images from individual real-world elements, highly accurate models, artist drawings, photographs, etc., stored in the library are restored to form "near-perfect" images. This is achieved by restoring edges, separating objects from their backgrounds, correcting intensity and color, generating realistic color, positioning object from system reference points, generating high-fidelity CGI objects, and generating graphic data, i.e., light sources. Ground contact and height reference points are also added. The "near-perfect" objects, surfaces, and special effects area are stored on a rapid access and high-speed data rate media. "Near perfect", means high fidelity with respect to the quality of the input image.

The gaming area data base provides the information necessary for the placement of the contents of the object library, surfaces, and special effects on a grid or gaming area. The objects may be placed by an operator or in a random manner by the computer. The objects in the library may be either stationary or capable of movement. The output of this function determines contents of the scene.

VEHICLE SIMULATION COMPUTATIONS

The vehicle simulation computations, based upon the vehicle math model and control inputs, determine the locations and viewing direction of the visual or sensor system for the primary vehicle. In addition, the computation may be performed on secondary vehicles based upon vehicle models and selected paths. The output of this determines the location of the observer.

COMMUNICATIONS SUBSYSTEM

Of course, the input/ output or I/O of the vehicle simulation system and I/O of the CGSI system must interface in an efficient manner. The communication subsystem can be a bi-directional link and buffer interfacing the two systems. This function is the 'handshake' and data flow between the systems.

FIELD OF VIEW AND COORDINATE TRANSFORM COMPUTATIONS

A FOV processor determines the presence of objects, surfaces, and special effects in the scene under construction. The output of a transformation matrix (V) converts real-world coordinates to screen coordinates. This data from the transformation matrix permits rapid testing and determines if all of any portion of the objects, surfaces and special effects are present in the scene. To avoid testing for the presence of all the objects in the data base, a "smart" algorithm tests only those objects or surfaces which are in the proximity of the scene. The FOV processor maintains a list of objects in the FOV and their object, surface or special-effect channel assignment. The function of the FOV computer is to determine what can be seen by the observer.

Controllers for Objects, Surfaces and Special Effects

The controllers "fan out" and process the control functions generated during the FOV computation. The processed control functions are passed to the object-/surfaces/special effects processing channels. The main functions performed by the controllers include the transformation of gaming area coordinates to screen coordinates, processing range data from the operator-controlled vehicle to each object in FOV, determining the intensity of each object based upon range and object identification, and commanding to the object library base for the retrieval of the correct image data. The function of the controllers is to "fan out" FOV data and generate precise control data for the scene.

Library for Objects, Surfaces and Special Effects

The library stores the images used to construct a scene. The Controllers command the selected images which are passed to-the processing channels. The only function of the library is to store images and provide the correct image upon command.

Processing Channels for Objects, Surfaces and Special Effects p The individual processing channels or "pipeline processors" normally process one large item (object, surface or special-effect) per channel at one time. The processing channels may have the capability of processing a plurality of smaller items in parallel. All the processing channels operate in an identical manner on each such item because it is the nature of the item which designates the function of the channel. In one embodiment each processing channel modifies one large or sixteen small items from the object library by the transformation specified by the control functions. That is, the object, surface, or special-effects processing channels function to change a stored image in normal straight-on perspective to scene conditions based on scene coordinates by changing image, position, size, rotation, and warp. Image intensity is modified based upon a range and object type. The function of these parallel pipeline processing channels then is to modify each object, surface and special effect used in a given scene as required.

Scene Construction

A scene construction module takes the individual image from each processing channel, separates the image from the background, and assembles the scene based upon range. In this manner, near objects occlude more distant objects. The high-frequency edges generated by assembling a scene from individual images may be smoothed by a Gaussian function. This operation matches edge and internal frequencies.

The scene construction module receives range information from the object and surface controllers. The range is used to determine whether or not a particular object is in front of, or behind, other objects in the scene. If the particular object pixel is the closest occupied pixel in the scene, then it will be the pixel displayed. This may be termed a "nearest" treatment.

The scene construction function accepts video inputs from each video channel and from a background-level source defined by the FOV computer. In this function the outputs may be real-time video signals to the special effects insertion module.

The digital scene construction function contains the following subfunctions: (1) object channel combination, (2) scene value adjustment to accommodate scene-wide intensity corrections, and (3) smoothing to compensate for object-to-object and object-to-background boundaries.

Special Effects

The translucent special effects are added after the generation of the scene. The special-effects module adds the special effects based upon range. Special effects, such as smoke, or dust, may occur ahead of, or behind images in the scene. The intensity masks stored in the object library and processed in the special effects processing channel control the transmissivity of the special effects. The intensity value input controls the intensity/color of the special effects such as black smoke and white clouds.

DETAILED DESCRIPTIONS OF ITEMS OF BLOCK DIAGRAM OF FIG. 3

Data Base

The data base hardware, like the data base itself, may be separated into two separate subsystems comprising object library and defined or gaming area hardware. The object library hardware produces and stores the imagery with high fidelity on optical disks. The gaming area hardware is used to load the locations of the objects, surfaces, and special effects. The data base hardware then operates non-real time to produce high-quality images on controlled backgrounds which are transferred to optical disks for storage.

The library hardware consists of a disk controller, disk drive, signal conditioning module and optical disk. Either a video (analog) or digital disk may be used for storing the images. A video disk provides about 6 to 8 bits, or 64 to 256 gray shades. A digital disk can provide up to 12-bit data. In all cases, except for very high resolution sensor images, the industrial 525-line non-contact video disk appears to provide images of adequate fidelity.

The use of a video disk is well known. The image is scanned by sequential rows which in effect constitutes a column scanning of the frame. As will be described later, however, it is normally more efficient to start any of the warp processes described herein with a first pass column processing of the output of the video disk. With this in mind, it is thus desirable to store the images on the video disk with ninety degree offset orientations s that the disk output will in effect be in column form to facilitate the first pass column processing.

Of course, if for some reason it is desired to store the frames on the video disk with a normal or upright orientation, this may readily be accomplished and a front end processing means may be provided for the processing channels which will serve to properly orient the data in a buffer to accommodate the processing characteristics of the warp sequence being utilized.

Although other devices will occur to those skilled in the art, in conjunction with an optical disk, the CGSI concept has been found to work quite bell and has not been particularly difficult or expensive to implement. The video disk offers the following advantages:

(a) High-density storage: about 54,000 frames per single side of a 12-inch disk.

(b) Relatively low data storage costs.

(c) Excellent random access: with some modification, it appears that an industrial disk will readily skip plus or minus 50 to 100 frames every 60 cycle field time or in $16\frac{2}{3}$ milliseconds. The actual jump occurs during the blanking interval, therefore, no image data is lost.

(d) High data rates: provides data at video rates.

(e) Long life and secure data: the disk is non-contact and read only, the data can not be damaged by bead crashes or operator errors.

(f) Rapid replication.

Figure 13:
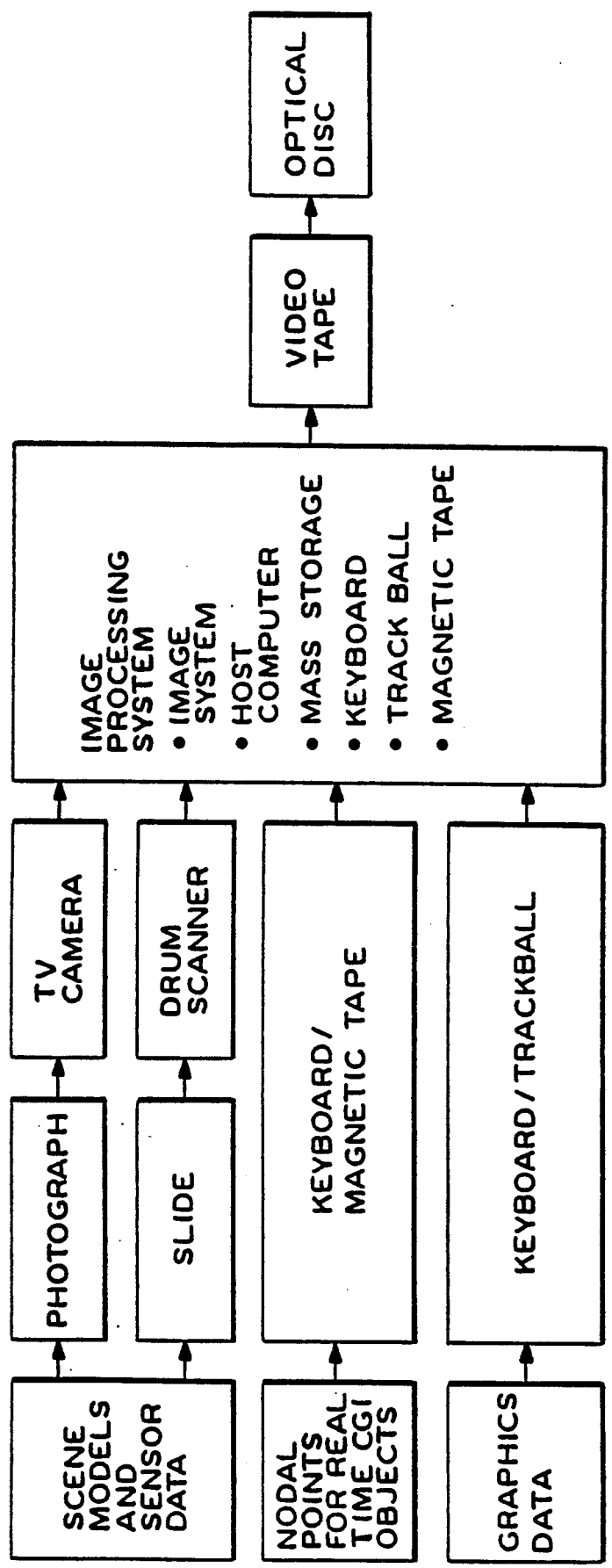
FIG. 13 is a system block diagram of hardware used for data base construction.

A system block diagram 1 of non-real time data base hardware is shown in FIG. 13. In this system edges are restored, the background is separated from the objects, intensity and color are corrected, realistic color is generated, objects are positioned for system reference points, non-real time high fidelity CGI objects are generated, and graphics data (light sources) are generated.

Data Base - Gaming Area

The gaming area contains the reference points for locating surfaces, objects and special effects. The gaming area may be set up in either of two manners, a manual mode or an automatic mode.

In the manual mode, the operator may search the object library and select which objects to place in the gaming area. The object files may be individual objects such as bushes, trees, surfaces, mountains, roads, lakes, or groups of small objects on one file. To place a 2D object in the gaming area, the operator selects an X,Y,Z surface reference point in gaming area 3-space wherein X, Y and Z, respectively, represent horizontal, vertical and range axes. A second X,Y,Z reference point determines the height and position. Thus, if the object is standing in a true vertical position, the X and Z references will remain constant, and the Y reference will change by the height of the object. If the object is tilted in one of the axes the X and/or Z axis reference points will change. surfaces may be defined by four X,Y,Z reference points, one for each corner. This includes, for example, the side of a house, a lake, a road, a river, etc. To produce great detail accuracy, three dimensional multi-image objects may be stored in a series of images which represent 1-degree increments both azimuth and elevation. These may be defined by three reference points which represent the center ground contact point, the center height, and a directional vector or pointing angle.

The automatic placement mode operates in much the same manner as the manual mode. The computer processes and places the objects in a controlled manner as will be discussed. The objects are placed by type and density.

Data Base - Objects Library

The object library contains images which, for convenience, maybe divided into three basic classes, namely objects, surfaces, and special effects.

Figure 15:
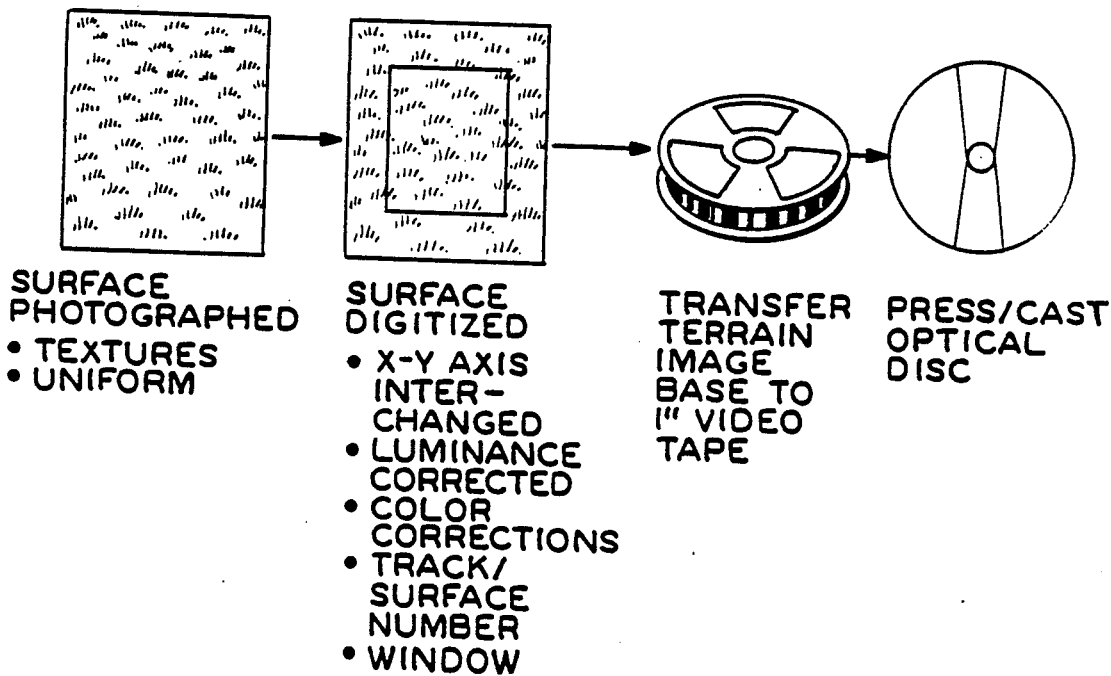
FIGS. 15 and 16 illustrate a process for obtaining high fidelity objects and surfaces to an optical disk which retains the object "library" of the data base.
Figure 16:
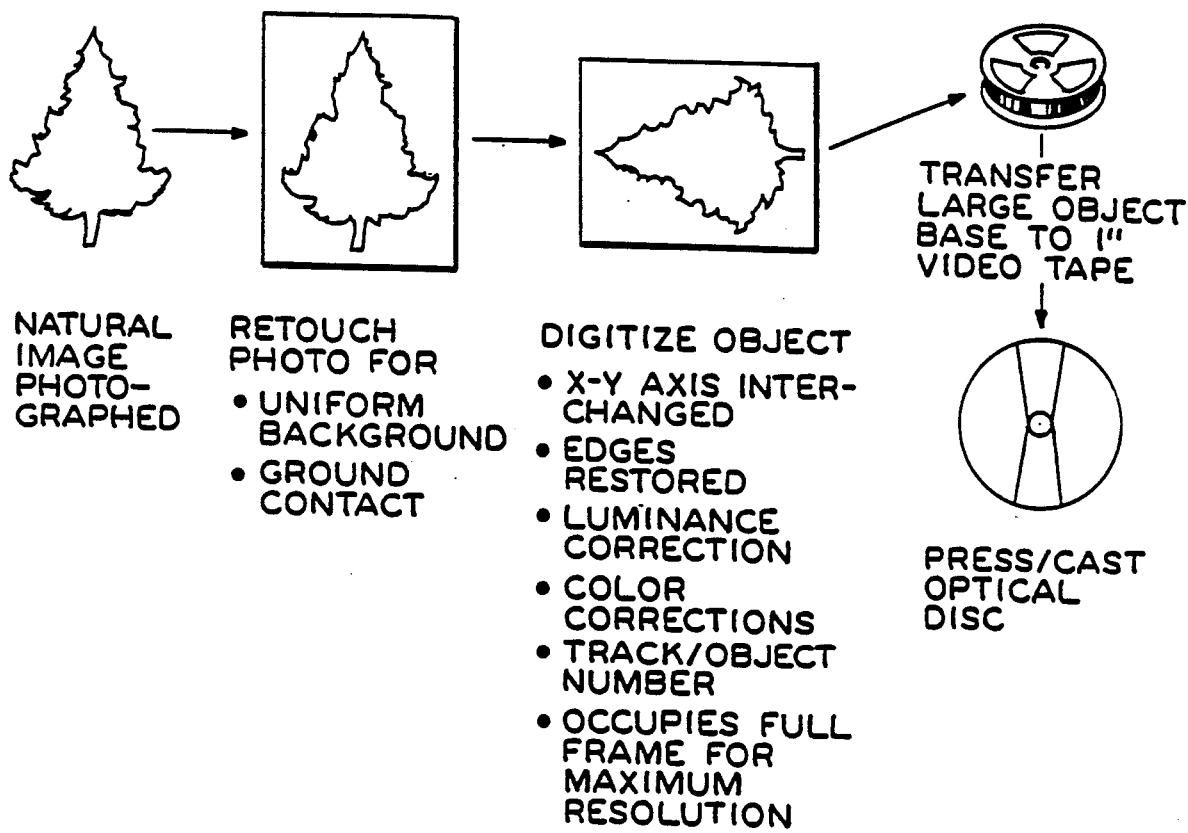

In the case of objects and surfaces, solid-surface objects may be further classified into two-dimensional, three-dimensional one axis, three-dimensional two axis, and light sources. A process for getting objects and surfaces to the optical disk with near perfect high fidelity is shown in FIGS. 15 and 16. Each of these will now be treated in more detail.

Objects - Two Dimensional

As previously stated, it has been found that most objects found in nature such as rocks, trees, bushes, shrubs, etc., may usually be presented in two dimensions with..sufficient realism. A picture is taken of the objects from the average aspect angle used in the desired simulation. As the elevation changes, the object is transformed between the reference points which results in an increased or decreased height, depending upon the perspective. In the case of trees and bushes, an object surface remains perpendicular to the viewer as during the flight path. Experiments have indicated that this effect is not noticeable. The relationship of objects to other objects and the rate at which the relationships change, in addition to the size and size changes, provide the depth cues. For two-dimensional objects, a single picture may be stored on a track of the optical disk and processed through a warp operation to obtain the proper rotation, size and position.

Objects - Three Dimensional - One Axis

If an object is tracked as during a flyover, the perspective changes by 90 degrees. In this case, the simulation may require a series of additional pictures in the vertical axis.

Objects - Three Dimensional - Two Axis

Figure 14:
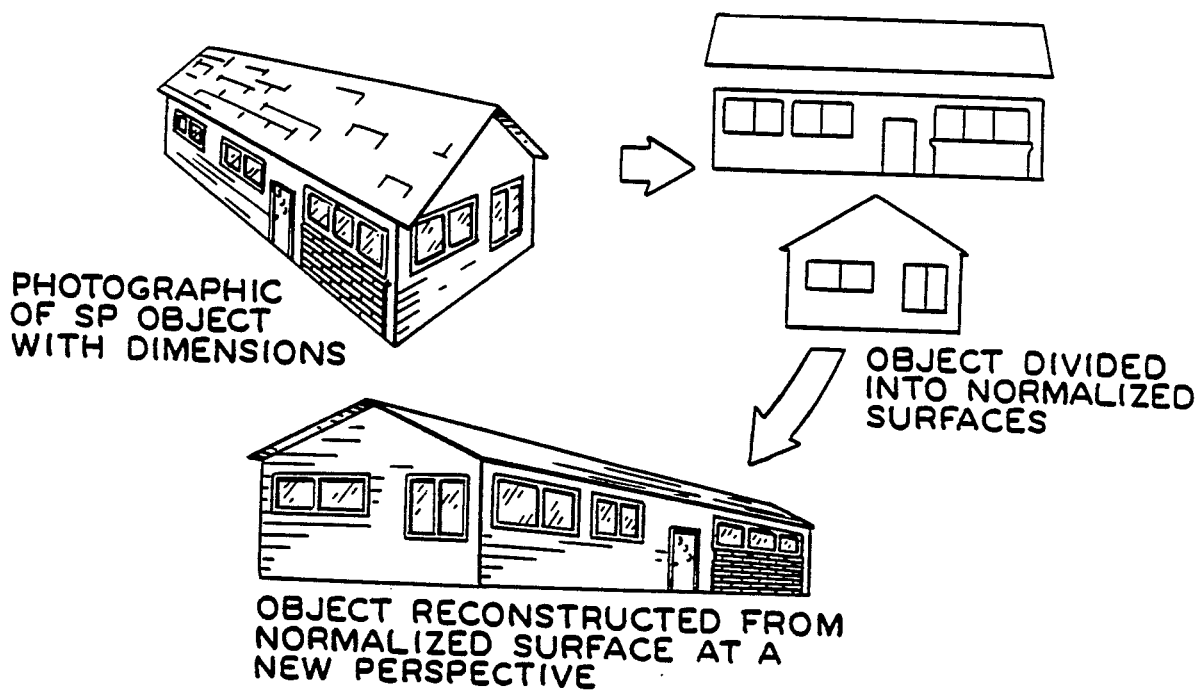
FIG. 14 illustrates a method applied to a house for generating three dimensional objects by breaking the objects down into subsurfaces.

Three-dimensional/two-axis objects or surfaces may be handled by three approaches. The first is by storing a series of pictures in as small as 1-degree increments in both azimuth and elevation. This is a powerful presentation technique which works extremely well when objects contain fine details which require high surface fidelity. The precise increments may be obtained by rotating models of large objects such as helicopters, tanks, and houses on two very precise rotary tables, and photographing the objects at each setting. A second method of generating three-dimensional objects is by breaking the objects down into subsurfaces such as the house shown in FIG. 14. A house such as this could be seen on the video display in various perspective views in a sequence of scenes but would never be assembled as a total object: image except by the computer. The sides are separated and assembled by a warp technique. This approach permits the use and construction of many objects from several pictures and approximate dimensions. A third method adaptable to large objects, such as hills, is to photograph an object at a series of fixed elevations with a relatively large spacing such as a 30-degree spacing in azimuth completely around an object. As an example for most simulations one elevation can be used, typically 15 degrees, and a series of pictures around the object in 30-degree increments has been found to be adequate.

Objects - Light Sources

The light sources are laid out from a string of points stored in memory and a warp algorithm warps the surface from a normal view to the vehicle perspective. This approach works very well and has been used to produce a demonstration landing tape.

Special Effects

With respect to special effects, these translucent objects or images add further realism to the scene by providing smoke, fog, dust, shadows, and haze. These objects may be stored as a mask which defines the outline, shape and transmissivity factor. The mask determines the combining percent of object and special effects. A second variable controls the intensity or color of the special-effect object. The mask determines the mixing ratio of the special effect with the background fixed variable-control intervals. This technique may be used, for example, to generate dust clouds rolling up behind a moving tank. A warp operation may also be applied to distort the special effect and a series of sequential frames used to generate the motion.

Thus, the translucent objects may be static or dynamic. The special effects objects have been defined in terms of transmission masks in the object library. This means that the data in the object library determines the percent of background objects present and the percent of special effects present by the following equation:

Pixel Value (gray level)=(1-MASK)*(BACKGROUND (gray level))+(MASK) *(SPECIAL EFFECTS VALUE−(gray value))

Figure 17:
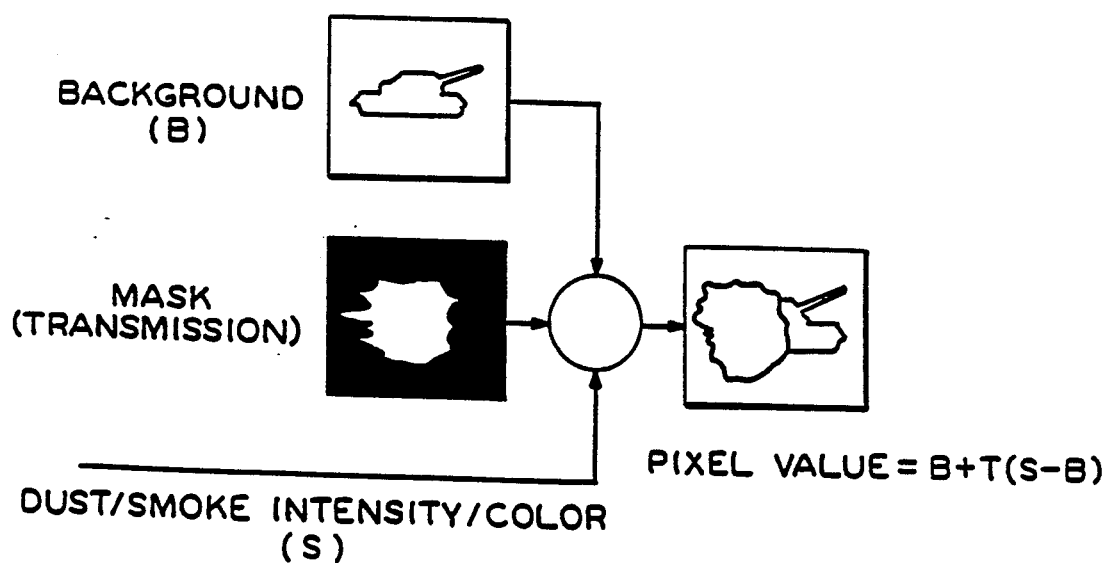
FIGS. 17 to 20 illustrate the treatment of translucent objects such as smoke, dust and shadows which are referred to as "special effects" objects.

The special effects value determines the gray shade of the special effects. This is shown in Figure 17. The masks for static special effects are easy to draw as on white paper using gray tone markers. In this manner the relatively unskilled or non-artist can readily sketch many general or specific clouds, dust, smoke, fog and haze configurations. The special effects objects are typically treated as 2D objects. An assortment of masks may be stored in the library.

Four specific special effects have been implemented as follows:

1. DYNAMIC SMOKE

Figure 18:
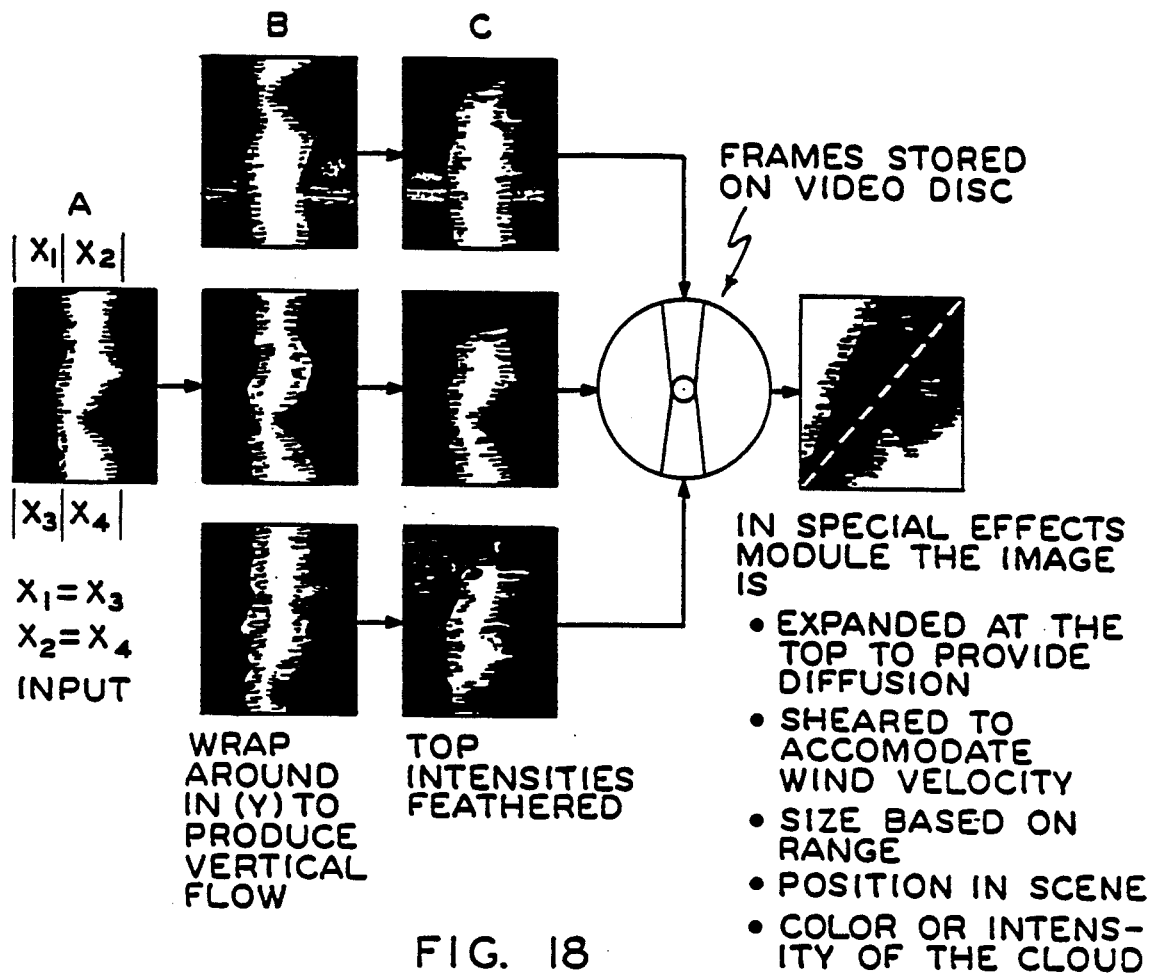

A smoke mask defining the outline and transmission factors is generated by an artist based upon picture and mathematical characteristics of the smoke. The top and bottom should be in the same location and have the same width as shown in A of FIG. 18. Next a series of frames, perhaps 480, are generated. Each pixel may be incremented one or more pixels in the Y axis when the frames are played back to produce a continuous circulatory loop. This is shown in B of FIG. 18. Next, the top of the smoke cloud in each frame is feathered as shown in C of FIG. 18 to match the dispersing of the smoke in atmosphere. The frames are stored in sequence on a video disk as shown in C of FIG. 18 and a warp function in the special effects processor is used to expand the top to simulate diffusion, shear the image to accommodate wind velocity, size the cloud based upon range, and position the cloud in the scene.

An initial condition parameter sets the color or intensity of the cloud. The rate at which the smoke fumes are played back determines the rate of flow.

2. Dynamic Dust

Figure 19:
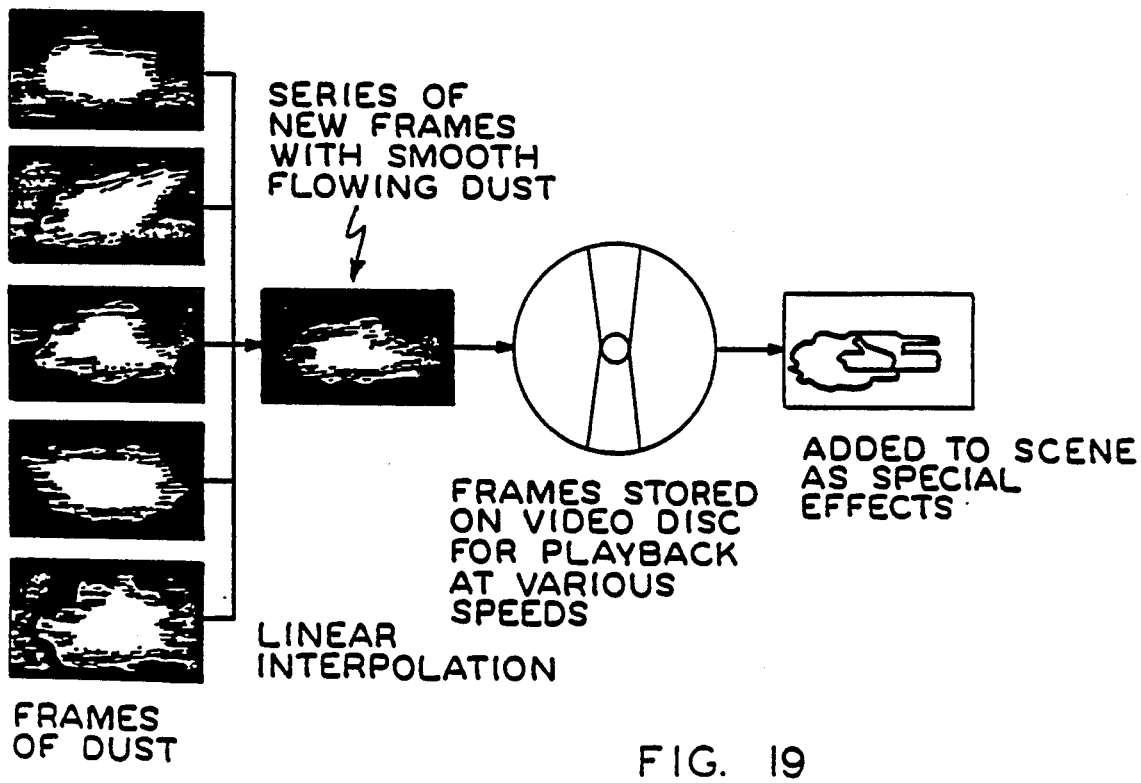

By way of example, five to ten dust transmission masks may be created. A series of linear interpolations between the various masks (1-2, 1-3, ..., 1-10, ..., 9-10) produce a series of frames which are stored on a video disk. A warp function in the special effects processing channel places the mask at the correct perspective, size and position in the scene and an initial set condition determines the color or intensity. This is shown in Figure 19.

3. Shadows

Figure 20:
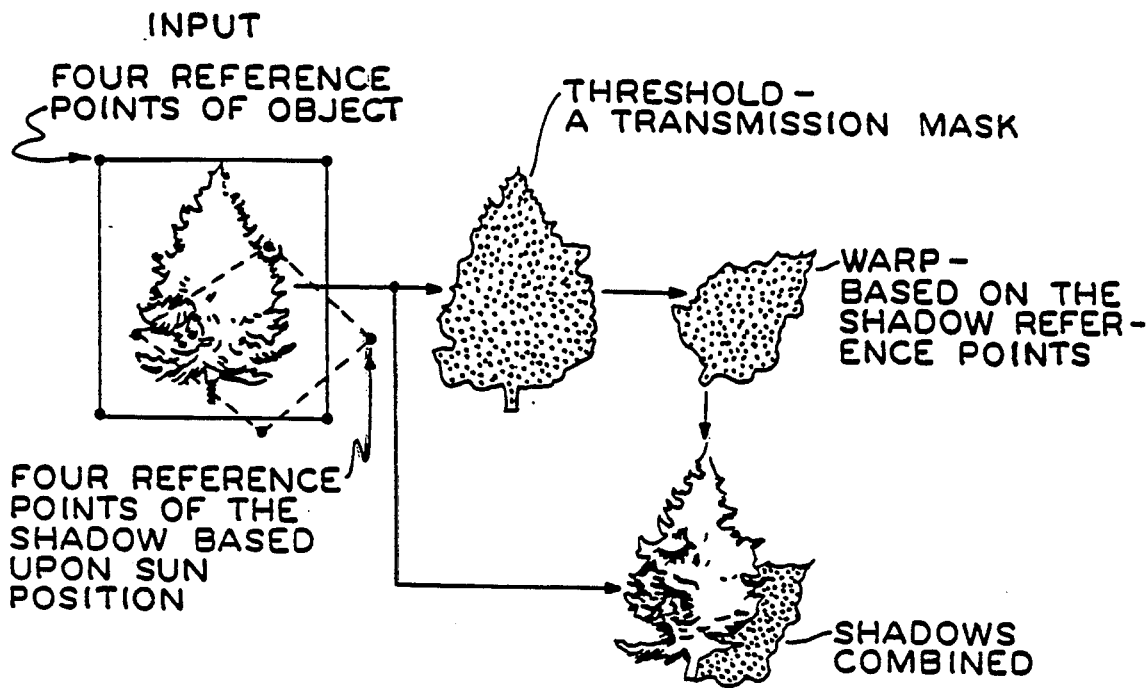

Shadows may be treated as translucent objects like dust and smoke. The transmission masks for shadows are generated from images in the object library. The transmission mask, a shadow, may be created by setting all the pixels in an object to one gray level which determines the transmission of the shadow. In the gaming area, the four reference points of an object are projected to the surface. The new points on the surface are the shadow reference points. The shadow, transmission mask, is warped to fit the scene based upon the shadow's reference points. This procedure is shown in FIG. 20.

4. Glint and Glare

Figure 21:
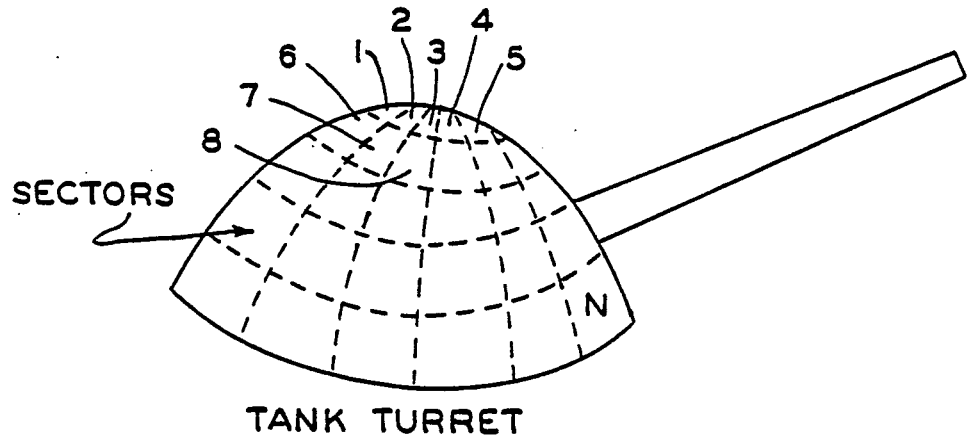
FIG. 21 illustrates the use of a sector mask for producing glint and glare effects with a CGSI system.

Typically, glint and glare are surface normal data. However, in a CGSI system, unless the objects are developed from CGI nodal data, the surface normal data is not available. To produce glint and glare, a sector mask is developed based upon the glint and glare bright areas produced by different sun angles as shown in FIG. 21. The sectors in the mask are gray level. That is, when stored in the object library, sector 1 may have a luminance value of 8, sector 2 a value of 16, etc. The sun angle table data sets the look-up tables in the object processor. If the sun is in sector 2, the input value of 16 in the look up table sets the output glint and glare values to a predetermined level. The remaining output values in the look-up table are zero. The result is a bright spot in sector 2. As the turret moves or the sun moves, the sector changes. In this way, dynamic glint and glare may be based upon sun and vehicle movement.

Data Base - General Discussion

Figure 22:
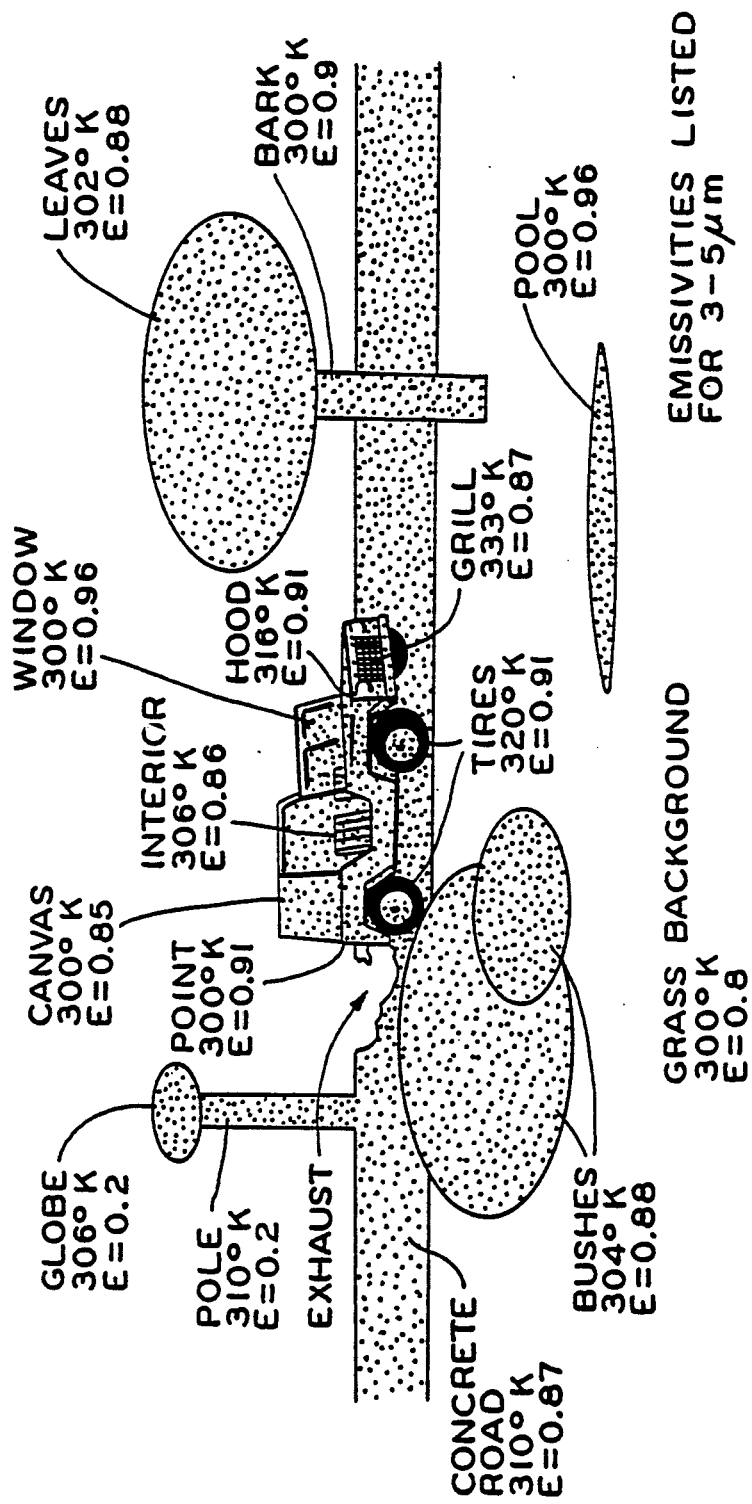
FIG. 22 illustrates IR imagery in a CGSI data base.

The CGSI data base is extremely versatile, consisting of real objects and simulated special effects. The realism achieved depends on the ingenuity of the operator setting up the particular simulation. The data base does not require skilled programmers, and lends itself to subject matter experts for the particular applications. If a group be working in a certain domain—IR, visual, millimeter wave, or radar, imagery from that sensor is loaded in the object file. This imagery simulates the sensor because it comes from the sensor. In addition, the parameter of the images or sensor may be modified when building the library or in the setting of intensity values during real-time processing. An IR example is shown in FIG. 22. In this illustration the selected emissivity may be changed to simulate changes to the sensor or a host of other parameters. If a specific area or type of terrain is under investigation, that imagery may be loaded into the object file without requiring the skilled services of a computer programmer or an elaborate, expensive data base change. In opposition to the state-of-the-art CGI systems, the CGSI data base is very well suited for rapid setup and rapid training over a range of complex human factors situations. The versatility is demonstrated by the fact that time of year, time of day, weather conditions and most other parameters may be selected and easily implemented by the experimenter without skilled software knowledge.

Data Base - Discussion of 2D and 3D Systems

2D Natural Objects

The classification "2D Natural Objects" includes trees, bushes, and small rocks. As previously stated, it has been found that one image taken at a depression angle of say 15 degrees will suffice for depression angles from 0 to 40 degrees and all views in azimuth. The dominant visual effects apparently are the geometric relationships and size changes of any object with respect to other natural objects in the scene. The stationary internal detail of an object enhances the scene by adding such needed detail. If a helicopter flies in a circular path around a tree the fact that the foliage does not change is imperceptible to the average observer. Trees with no leaves, however, when used by helicopter pilots for a hovering guide, are perceived differently and may require the 3D multi-image.

2D Man-Made Objects

Man-made objects have definite orientations such as the front or side of a vehicle. To test these issues, however, a simulation of a tank driving down a road with man-made or oriented objects (an old truck, a car, a tombstone, etc.) has been developed. In this simulation, the objects always remained normal to the viewer, but the 2D nature of the objects is not detectable when one watches the tape. It appears that small to medium objects may be presented in aspect for an angle of plus or minus 15 degrees in azimuth and elevation without any noticeable degradation in image quality. For complete fly-around conditions, however, a 3D approach is required.

2D Patch Techniques

Clumps or small patches may be warped and layed out to form a continuous high texture large surface. In the tank drive sequence, for example, a file of cattails was represented very successfully by a collection of many small patches of cattails each sized and positioned individually to produce a high degree of realism. In a helicopter sequence of a demonstration video tape, the helicopter initially takes off and flies over detailed grass constructed from a series of patches. The use of patches represents another very powerful technique for adding highly detailed surface information. This technique can also be used for water, rocks, roads, railroad tracks, etc.

In addition, each patch can have dynamic motion. That is, the wind or rotor blast could be blowing the grass or water. This effect is simulated by storing a series of dynamic frames on the optical disk and feeding the frames through the surface processors analogous to the simulation billowing smoke above.

This technique also may be used to represent groups of objects at a distance. In the helicopter sequence, a cornfield shown during a "pop up" was constructed using several identical patches of a cornfield. This same approach may be used for dense trees, background, or any highly detailed textured surface.

2D Surfaces

Entire areas of textured imagery may be warped to produce textured surfaces. This concept may be extended to long narrow "objects", such as runaways, railroad tracks, roads, creess, streams, etc. Linear warping techniques may be used on near square "objects," but a true perspective warp should be used for realistic representation of long narrow "objects" to avoid image distortion.

A 2D surface need not be limited to sides but may include light sources (points or strips of light), small rolling hills, mounds of sand, ponds, or small lakes. A city simulated using CGSI techniques can be configured from surfaces, streets, sidewalks and building fronts.

2D Multisurfaces

Most man-made objects can be broken down into multisurfaces such as the sides of a building or truck. By treating each side as a 2D surface and by allowing the computer to construct the visible sides of the object in the scene, the 3D objects can be created from a small data base of individual sides. As an example, consider a house with two sides, two ends, and two roof sections. Each section is determined by four (X,Y,Z) reference points. Therefore, four corners x three reference points x six sides equals 72 coordinate numbers. They are required to locate all of the house detail in the gaming area. The many views of objects required by the CGSI technique may be obtained from models, generated from estimate size data, or digitized from actual photographs of real objects.

3D Multi-View

Figure 23:
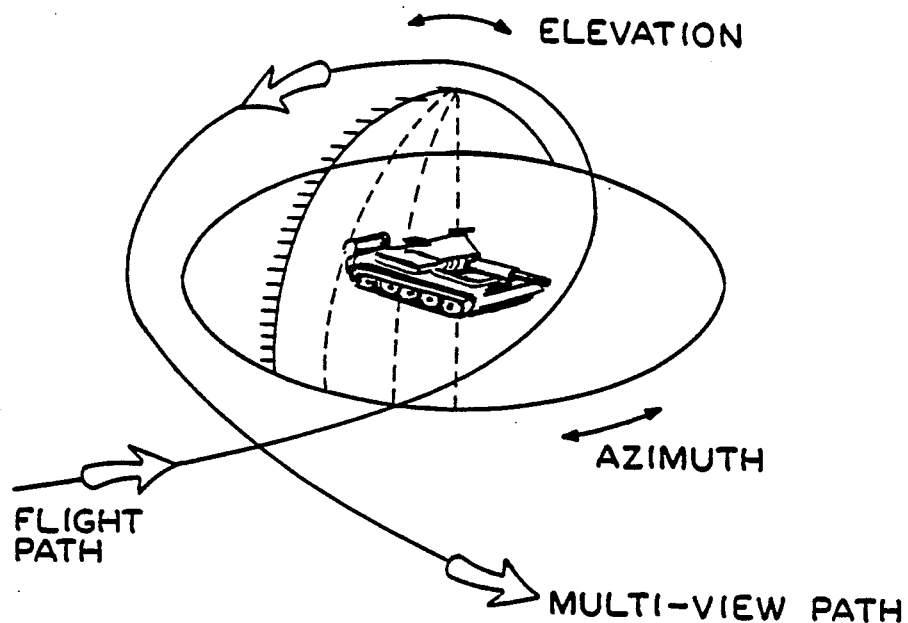
FIG. 23 illustrates a flight path around a large object, i.e., a tank, which is stored as a series of two dimensional views in an optical disk in one degree increments in azimuth and elevation.

Complex high fidelity object images lose fidelity when they are reduced to a flat or curved surface. Two examples are a tree with branches, but without leaves, and a tank having many irregular surfaces. These objects, which may occupy more than a third of the screen's area, may be stored as a long series of 2D views taken in as little as 1-degree increments in azimuth and elevation. This multiple view approach requires about (90×360) 32,400 frames or about 60 percent f a video disk holding 54,000 frames per object. The most demanding flight path, as shown in FIG. 23, is one which encompasses the object at a changing elevation. If the frames be indexed on the disk in 1-degree incrementals from 0 to 90 degrees in elevation, for each 1-degree incremental change in azimuth, the disk needs to jump about 100 frames to reach the next frame of interest even if the flight path is almost level. The disk must be capable of jumping approximately plus or minus 100 frames during the vertical retrace of each TV field. This allows flight around an object at various elevations in 6 seconds (360 degrees/60 field/sec). This is a realistically adequate limit as even a 6-second tight 360-degree turn would make the pilot dizzy. Other ideas, involving linear and nonlinear interpolation, have been explored for 3D multi-view objects, but to date none has equalled the fine detail.

Special Effects

The special effects are processed like 2D objects and surfaces except that a transmission mask is used. The mask may be dynamic (changing at each frame as for dust and smoke). Also, the color and intensity of material may be controlled. All of these special effect techniques have been demonstrated in a CGSI video output mode. Occulation The CGSI concept allows objects to have holes or windows in them. That is, for example, one may see through a clearing in the branches to the next object or background with decided realism. Features o parts of features nearer the viewpoint always properly occult features or parts of features farther away. As explained elsewhere herein, the scene construction module uses range data to select each pixel in the final scene. To demonstrate the occulation capability which utilizes the range data, three examples will now be presented. These are illustrated by FIGS. 24–27.

Figure 24:
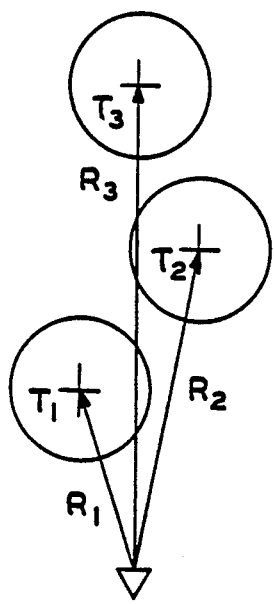
FIGS. 24 to 27 illustrate the occulation capability of the CGSI system.

In the first example, shown in FIG. 24, occulation of three trees may be based on range data to the gaming area reference points. In this manner, $T_1$ occults to $T_2$ and $T_3$; $T_2$ occults $T_3$.

Figure 25:
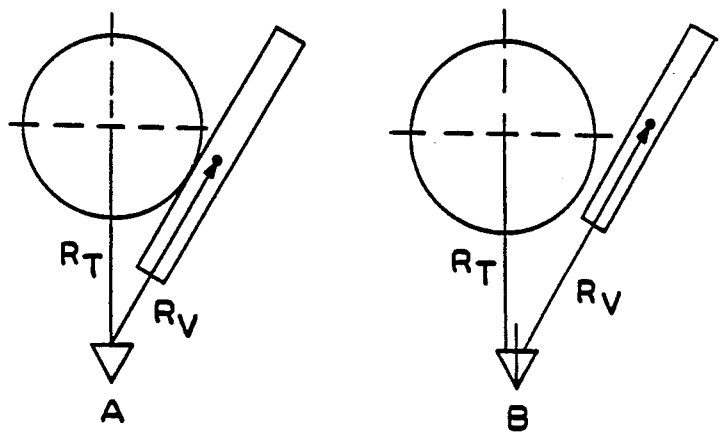
Figure 26:
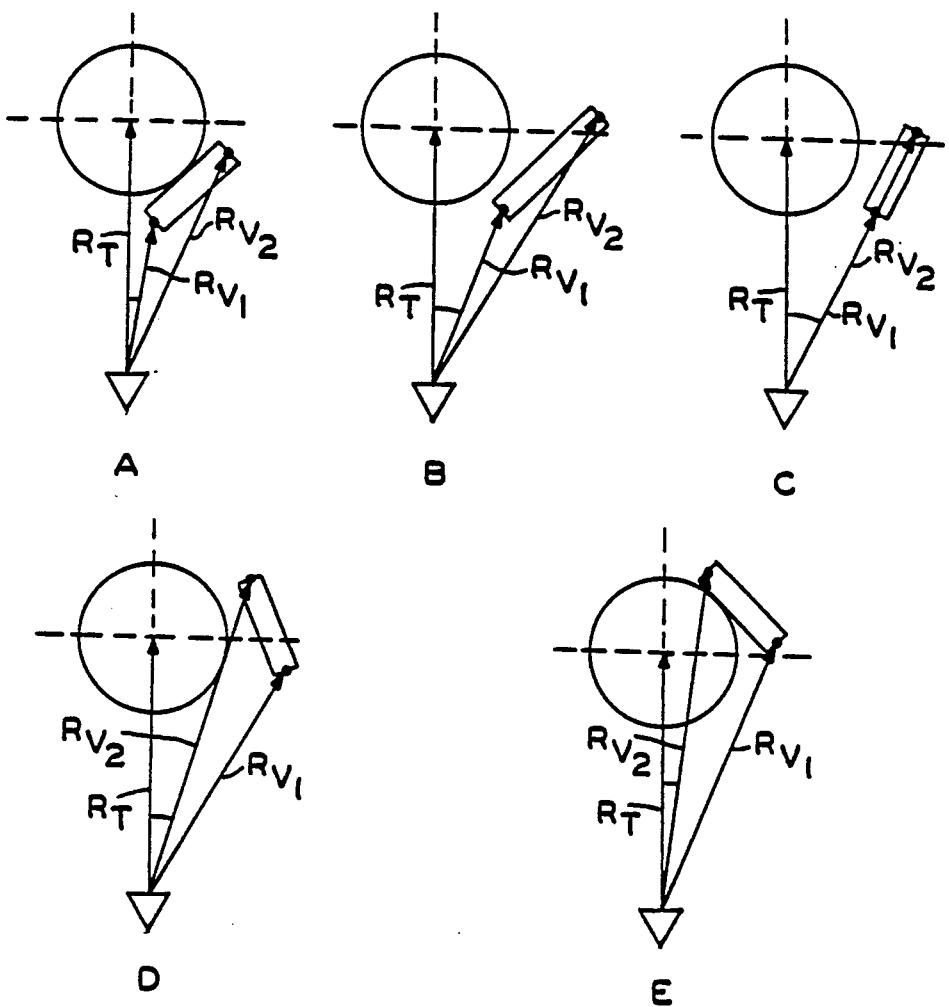

In the second example, a long slender vehicle is moving about a tree. As shown in FIG. 25, the use of singular range points for the vehicle will provide inaccurate occultation. In both A and B, the vehicle is in front of the tree. However, in B the vehicle is placed behind the tree because $R_V$ is greater than $R_T$. This approach does not suffice. In FIG. 26, two range data points, a maximum and minimum, are maintained for the vehicle. Note that the vehicle range now may be determined by using the vehicle range vector closest to the range vector of the tree. Segments A through D of FIG. 26 demonstrate successful placement of a vehicle driving around a tree.

Figure 27:
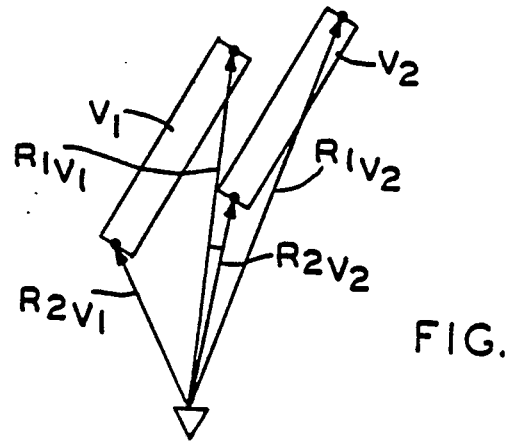
Figure 28:
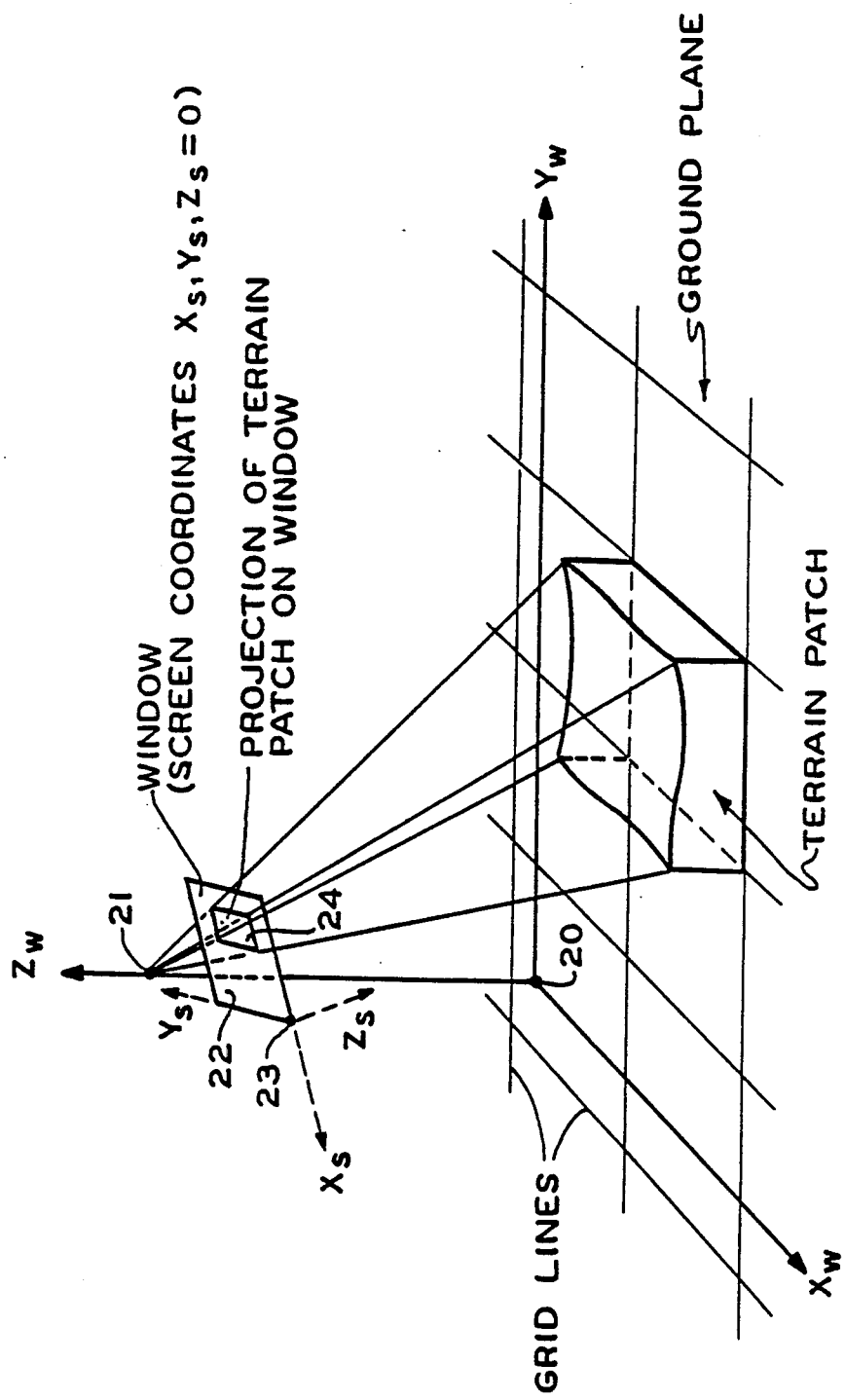
FIG. 28 is a schematic representation of the field of view (FOV) function.

The third example addresses the problem of two vehicles as shown in FIG. 27. Again, the range may properly be selected by using the closest vehicle vectors. In this manner any number of objects may be addressed.

2D/3D Conclusions

The preceding sections have outlined several 2D and 3D approaches to the placement of objects and special effects in the scene and their implementation guides. By means of these techniques, it is feasible to simulate most objects and conditions encountered in the real world. Applications of the appropriate 2D/3D technique as necessary will occur to those skilled in the art.

Vehicle Simulation

The hardware and software for generating the location of the trainee's vehicle or other scene recognition means relative to the gaming area and the location of moving objects in the gaming area are not themselves a part oft he CGSI system invention disclosed herein. However, the X,Y,Z, roll, pitch and yaw signals indicating instantaneous locations of such vehicles are sensed by the CGSI system hereof and, in response thereto, the video display scenes of the simulated gaming area are developed.

Communications Subsystem

The hardware to interface the CGSI system to the vehicle simulator appears to be unique for each application. Each user has an established vehicle simulation computer and the CGSI system can have a standard input. It is the interface hardware that converts the digital output signal from the vehicle simulation computer to match the input to the CGSI FOV computer. This hardware interface may range from a simple cable to a complex interface containing buffers and microprocessors.

FIELD OF VIEW AND COORDINATE TRANSFORM COMPUTATIONS

In FIG. 2S there is shown a schematic representation of the FOV function relative to the gaming area. The origin of the gaming area coordinate system is represented by point 20 and the eyes of the observer may be at any point 21 in the gaming area. The screen or CRT immediately in front of the observer or trainee has the outline 22 and the origin of the screen coordinate system is at point 23. The four corners of a terrain patch are projected through the CRT which may represent the windshield of the aircraft and an outline 24 thereon represents the projection of the terrain patch on the screen which is seen by the operator.

Two types of vehicle simulation computations supplied to the FOV processor are (1) position vectors which define the changing positions of the aircraft relative to the origin 20 of the terrain coordinate system and (2) rotational data (yaw, pitch and roll) which defines the changing attitudes of the aircraft relative to the origin 20 of the terrain coordinate system. Equations representing this data are set forth in FIG. 29.

In accordance with known prior art principles the vehicle data in the form of the equations set forth in FIG. 29 can be processed to yield the distance or range of any object or surface, such as the terrain patch, from the screen 22 and the screen coordinates for the four corner points or vertices of the projection of the object or surface on the screen. In fact, the prior art capability is such that the terrain patch or any object or surface may have the shape and size of any form of convex polygon and the screen coordinates of the plurality of vertices thereof can be computed.

Figure 30:
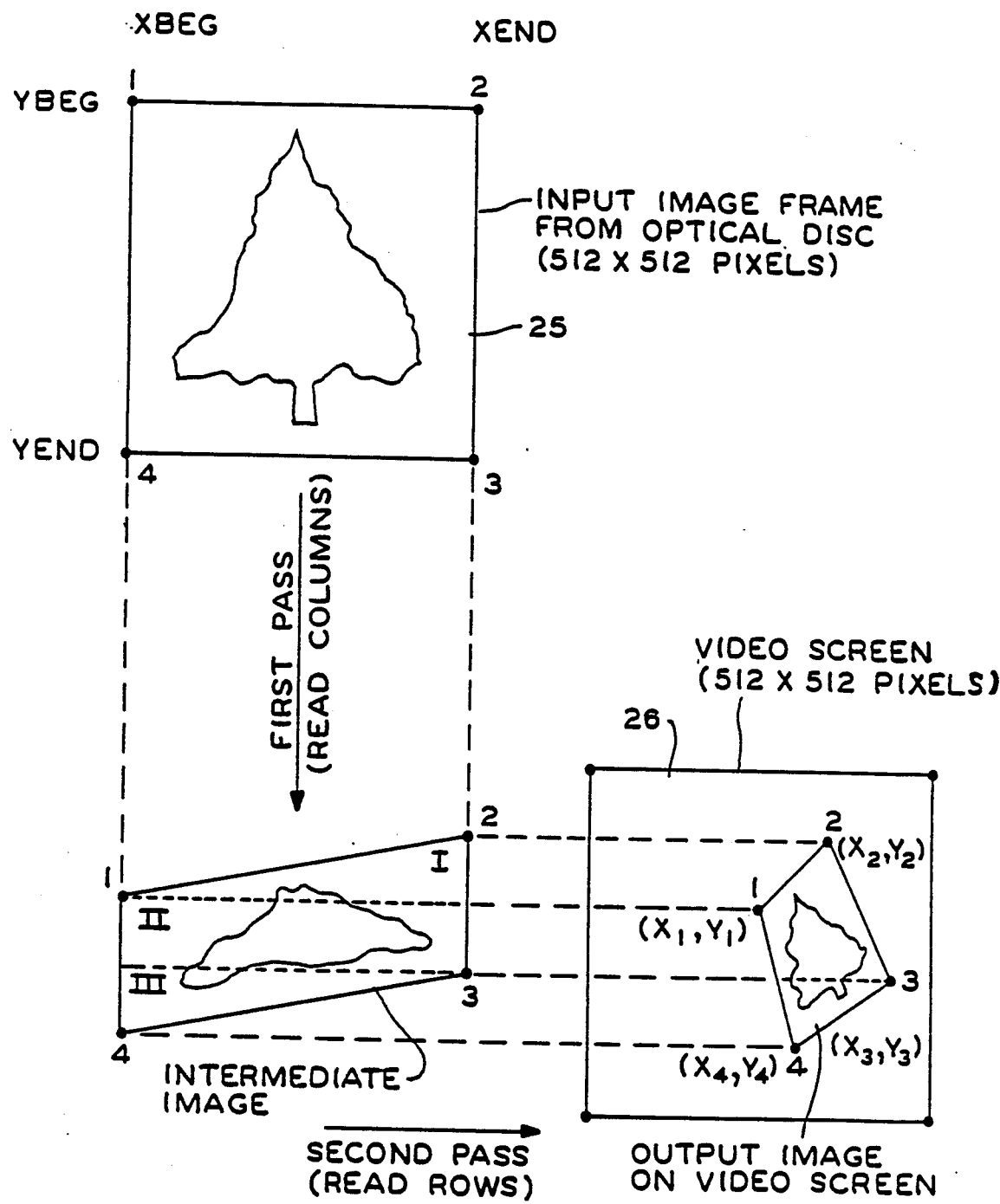
FIG. 30 is a graphic representation of a two-pass image warping technique.

The necessity of utilizing this advanced capability of the prior art, however, is not required in the present invention because of the manner in which objects, surfaces and special effects are stored in the data base. As previously mentioned and as illustrated in FIG. 30, photographs of objects and surfaces are stored on a video disk and access to them is controlled by an index controlled by the FOV processor. Each object or surface has its input image in a frame which is the same size as the video screen which may be 512 lines having 512 pixels per line.

The data base has a list of all the objects, surfaces and special effects (individually denoted by the collective acronym OSSE) in the gaming area. Their locations therein are designated by gaming area coordinates. Also, the data base contains information regarding the height of each object therein. The FOV software allows real-time determinations of the OSSEs in the field of view and the respective distances of the OSSEs from the video screen.

In FIG. 30, the frame 25 containing the input image of an object has a shape which depends on the true shape of the object and the FOV processor uses that height in the transform equations of FIG. 29 to determine corresponding screen coordinates 1 to 4 of the video screen 26. The intermediate image 27 is an integral part of a linear warp algorithm which facilitates the mapping of the image from the input frame 25 to the screen frame 26 and will be discussed in detail further on herein.

In summary, relative to the FOV function, the processing of the data from the vehicle simulation computations results in (1) the determination of osse's in the field of view, (2) the distance of each OSSE from the location of the observer, and (3) the determination of the screen coordinates of the four vertices to the enclosed space of which the input image of each OSSE is to be mapped. The above data for each OSSE is directed to an OSSE processing channel as will be described below.

OBJECT/SURFACE/SPECIAL EFFECTS (OSSE) CHANNELS

The processing channels or OSSE channels process Object, Surface and Special Effects data from the data base library. As stated above, identical channel hardware is suitable for all three functions.

Figure 31:
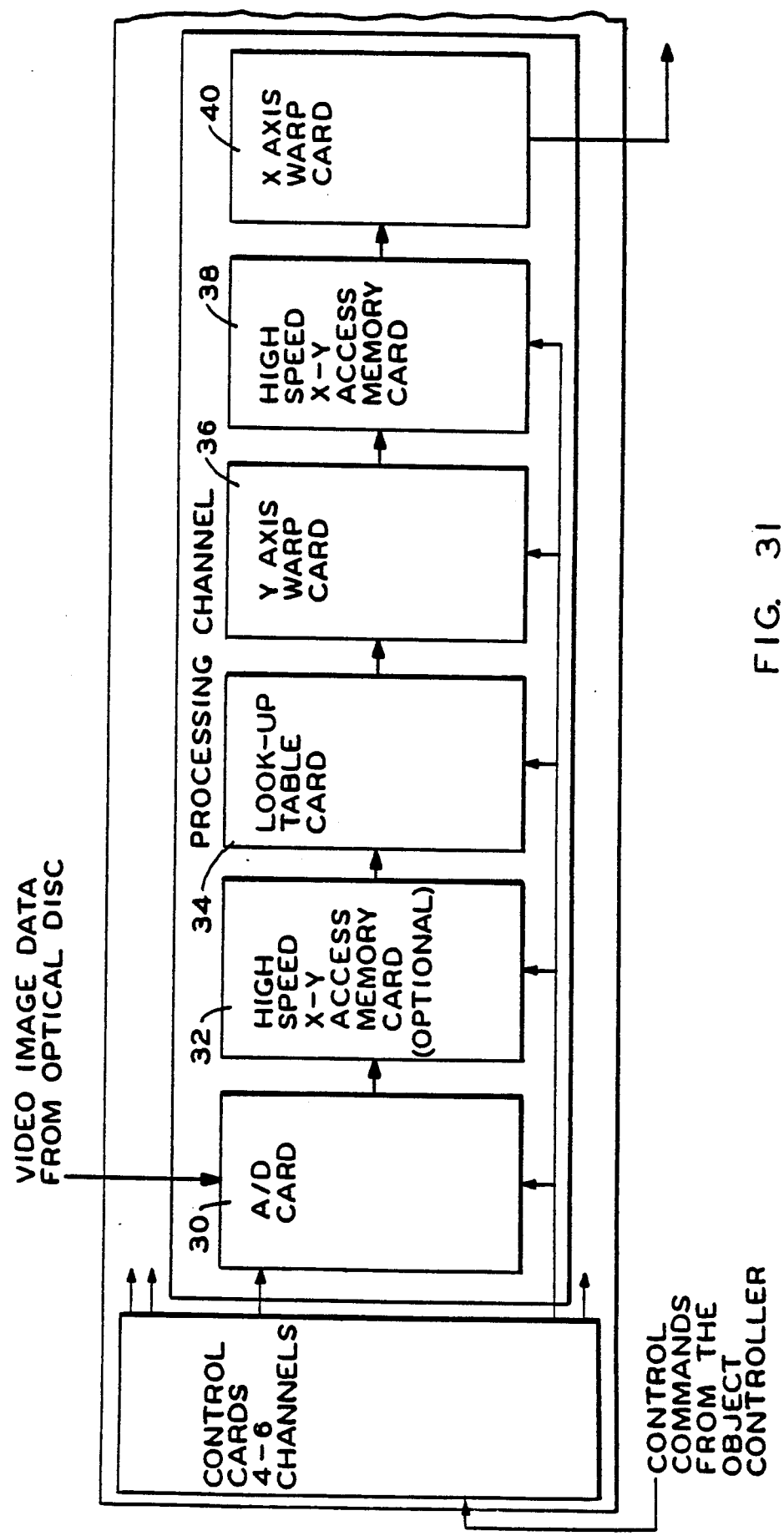
FIG. 31 is a block diagram which illustrates a channel or "pipe line" for processing object, surface and special effects data from the data base library with the use of a warp technique.
Figure 32:
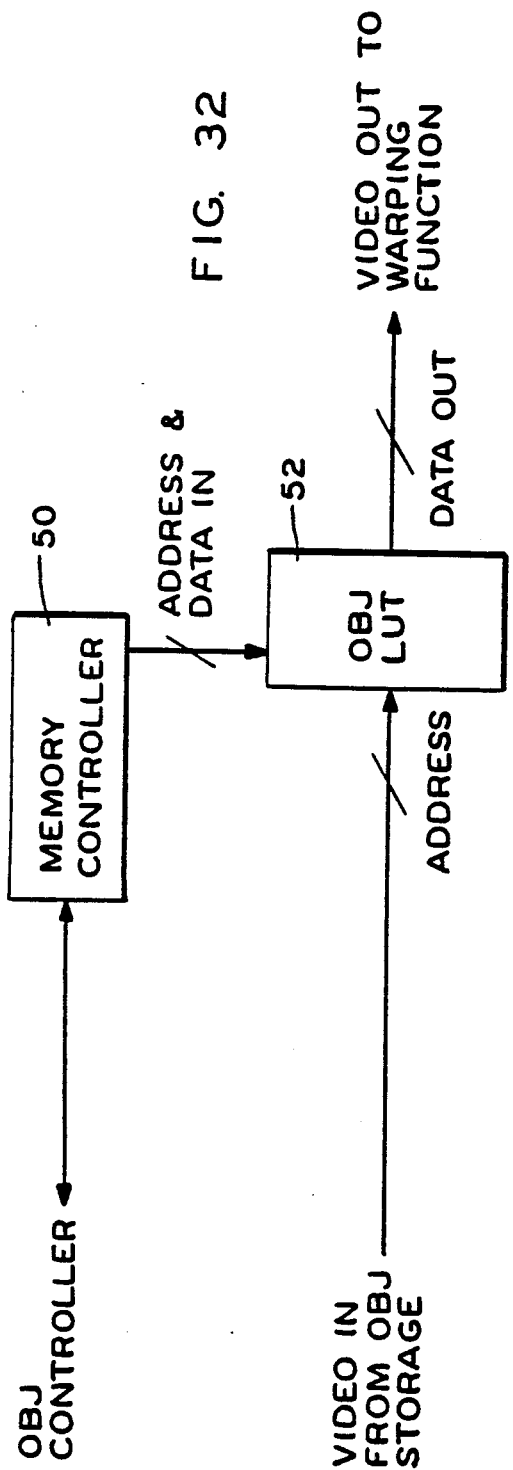
FIG. 32 illustrates implementation of the intensely control function of the look-up-table card of the channel shown in FIG. 31.

The OSSE channels are important and essential to a CGSI system. A possible hardware implementation of an OSSE channel is shown in FIG. 31.

In order to obtain the correct intensity, color, image, size, location, rotation and perspective, several functions are performed on library data by an OSSE channel as follows:

(a) A high-speed (approximately 100 nanosecond samples) analog-to-digital converter 30 converts the object image to a digital format. Conventionally, the digital format has 512 pixels per line, 480 active lines (525 total) and eight bits per pixel (256 gray shades).

(b) A high-speed memory card 32 accepts the digital data in either the X or Y axis. The axis and direction of loading depends on the rotation of the image. The data is loaded to minimize pixel compression during the processing passes. For example, instead of rotating an image 60 degrees, which may result in some image loss, the data is loaded in the perpendicular axis (at 90 degrees) and rotated 30 degrees. The memory card also holds the object image for processing when the optical disc controller is selecting a new track (image). This card may be omitted if the objects are stored on the disk in 90 degree increments or if the rotations are less than +45 degrees.

(c) A lookup table or lut 34 modifies the intensity values of images for range and contrast effects. This operation requires a delay of only a few pixels.

(d) A warp card 36 transforms the image in the Y axis on a line-by-line basis. The starting point (offset) and magnification factors shift and compress or expand the pixels of each line. This operation delays the flow of pixels by one line.

(e) A second identical high-speed read/write X and Y axis memory card accepts and stores the transformed Y data for an odd and even field to form a frame. After the Y axis field is loaded in the Y axis, the X axis data is read out by line, and even and odd fields. This buffer operation requires one video frame.

(f) A second warp card 40 identical to card 36 processes X axis data by shifts and expands or compresses lines. Again, this operation delays the image by approximately one video line.

INTENSITY CONTROL

The intensity control of the look-up-table or LUT includes a memory controller 50 and an object LUT 52. During the active part of the display time the input video is used to address the LUT and the data output of the LUT is passed on to the warping function implemented by cards 36, 38 and 40 for further processing. This procedure effectively maps input intensity values into output intensity values via the data stored in the LUT. During the vertical blanking interval, memory controller 50 can assume addressing control of the LUT 52 (if so commanded by the object controller) and load a new set of values into the LUT for the purpose of defining a new object, or modifying the appearance of the previously selected object. The intensity control can be properly broken down into two separate functions which provide intensity corrections related to a specific object as performed by card 34 and intensity corrections related to the entire scene as will be referred to below.

Memory controller 50 may be implemented by a single chip microcomputer and LUT 52 may be implemented as a RAM with multiplex and control circuitry to allow access from both the video data and data in memory controller 50.

LINEAR WARP TECHNIQUE

One linear warp technique associated with the invention is implemented by cards 36, 3S and 40 and involve a procedure to perform spatial transforms on a digital image represented as a matrix of intensity values. Given a rectangular input image accessed from an optical disk data base, the technique in operation will map linearly to four corner points of the output image on a video screen. As illustrated in FIG. 30, this is accomplished with two orthogonal passes as indicated. Each pass linearly interpolates each input line to a different size and positions it in the output image. The size and position parameter for each interpolation are determined from the input image corner coordinates and the output corner coordinates. The interpolation consumes consecutive input pixels and generates consecutive output pixels. The two passes interact to perform size, translate and rotate transforms plus nonstandard mappings.

The process is independent of the FOV equations which calculated the four output corners on the video screen. It is computationally invariant for all transforms once the four output corners are established. It operates on line and column oriented streams of consecutive pixel values and is therefore ideally suited for real time hardware implementation.

Each pass simply sizes (enlarges or reduces) the input line and positions (offsets) it in the output video image. Both of these operations are accomplished by continuous interpolation over the discrete field of pixels. This allows the continuous line sizing and subpixel positioning of output lines and columns which completely eliminates aliasing of diagonal edges. The heart of the technique is an method which allows the system to continuously size a discrete input line and phase its position in relation to the discrete output grid.

INTERPOLATION

Figure 35:
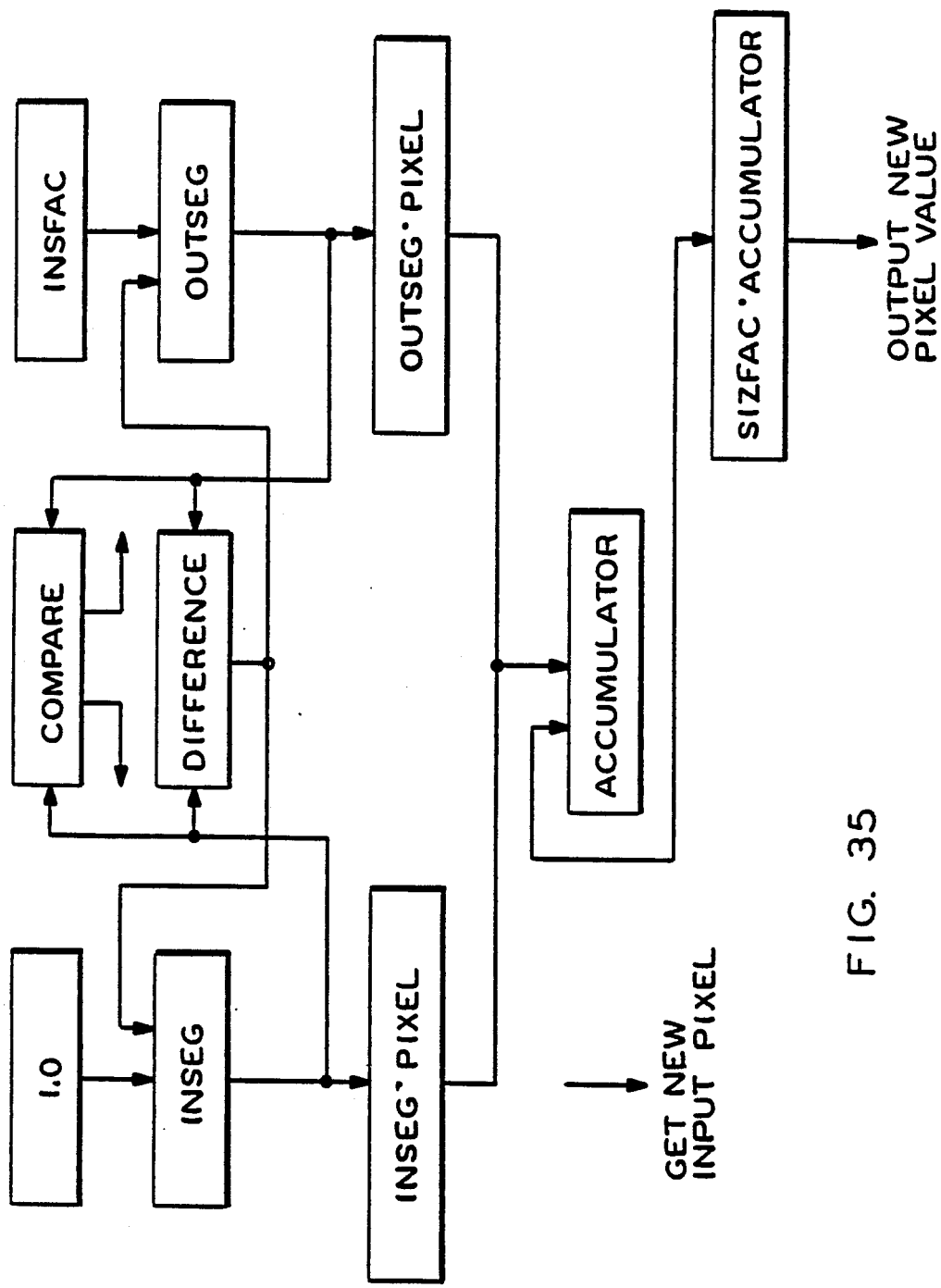
FIG. 35 shows a flow chart for a continuous interpretation technique for the process indicated in FIG. 30.

FIG. 35 depicts a flow chart for a continuous interpolation operation for the process indicated in FIG. 30 in which SIZFAC is the "Size Factor" applied to the input image line and INSFAC is the inverse of SIZFAC and has the additional significance of indicating what portion of input pixels is required to create an output pixel. INSEG is the portion of the current input pixel available to contribute to the corresponding output pixel and OUTSEG is the portion of the output pixel yet to be completed.

With the above definitions well in hand, the process begins by comparing the values of INSEG and OUTSEG. If OUTSEG is smaller than INSEG it means that there is sufficient input pixel available to complete an output pixel. Conversely, if INSEG is smaller than OUTSEG it means that there is not sufficient input pixel left to complete the output pixel. Thus, the current input pixel will be used up and a new pixel must be fetched to complete the output pixel. Only under these two conditions will an input pixel be used up without finishing an output pixel or an output be completed without using up the input pixel.

If an output pixel remains to be completed the current pixel value is multiplied by OUTSEG and added to an accumulator. INSEG is decremented by the value of OUTSEG to indicate usage of that portion of the input pixel then OUTSEG is initialized to INSFAC indicating that a complete output pixel remains to satisfy. The contents of the accumulator are scaled by SIZFAC and the result is the value of the next output pixel. The process then returns to compare the new values of INSEG and OUTSEG.

If an input pixel remains to be used up the current pixel value is multiplied by INSEG and added to the accumulator. OUTSEG is decremented by the value of INSEG to indicate that the portion of the output pixel has been satisfied. Then INSEG is reinitialized to 1.0 and the next input pixel is fetched. The process then returns to compare the new values of INSEG and OUTSEG.

The heart of the process is the interplay between INSEG and OUTSEG scaling input pixels to output pixels. The effect is one of pixel scaling and migration from one discrete grid to another discrete grid through a continuous interpolation process. Of course, the success of this continuous scaling process depends on the fractional precision of INSEG and OUTSEG. With sufficient precision the effect is of perfectly smooth pixel migration between the two discrete grids.

Subpixel phasing is accomplished by initializing OUTSEG to some percentage of INSFAC to create a partial first output pixel. The last output pixel may not be completed when input pixels are exhausted, resulting in a partial last output pixel. This allows continuous positioning of the output with relationship to the discrete pixel grid and eliminates edge aliasing.

With the capability to continuously size and phase a discrete input line in relation to a discrete output grid, the warp to the quadrilateral becomes a matter of determining the size, phase, and output location parameters for each column of the first pass and each line of the second pass.

The first pass, (FIG. 30) reads the input image and writes the intermediate image vertically left to right. The object is to migrate all pixels into their correct vertical axis orientation. This is accomplished by mapping the first column between Y1 and Y4 and linearly interpolating over all other columns such that the last column begins at Y2 and ends at Y3.

The second pass reads rows from the intermediate image and writes rows to the output. Since all pixels are now in their correct row, the rows can be processed independently in any order such as a two to one field interlace. The object of the second pass is to migrate all pixels into their correct horizontal axis orientation.

The second pass mapping must be considered in three processing regions as indicated by the dotted lies of the intermediate image. There is a different output location delta for each region and the size factor is updated with its delta only during middle region processing. With the correct initial values and deltas each corner is mapped into its output X coordinate and the rest of the image follows in proper relation.

The initial output location is the intersection of the 1-4 edge with the horizontal line through the uppermost corner. The location delta for the upper region is the slope of the 1-4 edge if corner 1 is uppermost or the slope of the 2-3 edge if corner 2 is uppermost. The location delta for the middle region is the slope of the 1-4 edge. The location delta for the lower region is the 1-4 edge slope if corner 4 is bottommost or the 2-3 edge slope if corner 3 is bottommost. The initial size factor is the length of the horizontal line segment from the second highest corner to the horizontally opposite edge. Th size delta is this value subtracted from the similar value of the third highest corner and divided by the vertical distance between the second highest and third highest corners.

In this manner, corners 1,2,3,4 of the input image are mapped to corners 1,2,3,4 of the output image. This mapping may require a 90, 1O, or 270 degree preorientation of the input image prior to the mapping discussed here. This orientation is determined by computing the area of the four possible intermediate images and choosing the orientation that results in the largest area. After preorientation the corners of both the input and output images are relabeled such that corner 1 is the extreme upper, left corner.

Figure 33:
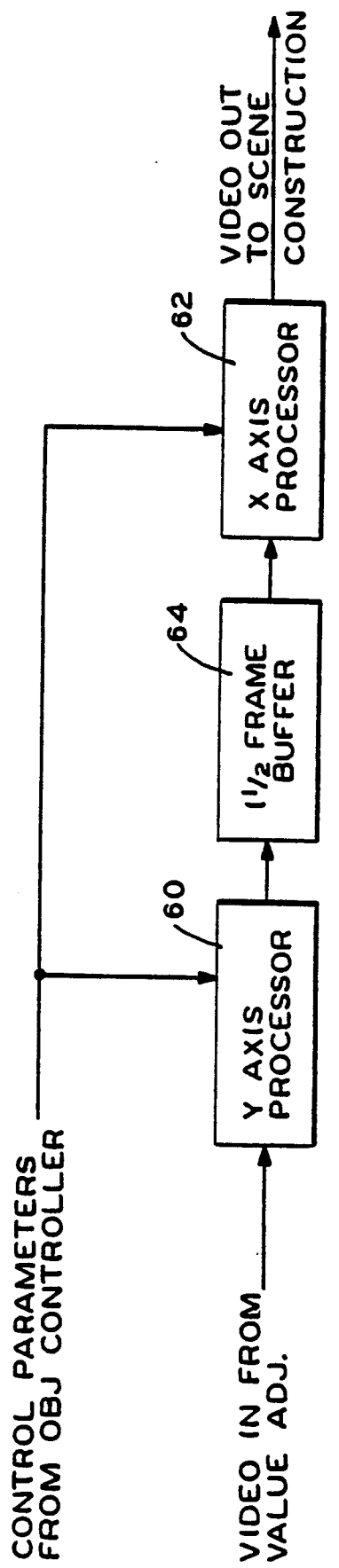
FIG. 33 is a simple block diagram illustrating two identical object processors for two-pass processing of an input image in performing the warp technique.

The warping function, then, implements a process using both column-by-column and line-by-line passes. Figure 33 represents the top-level block diagram for the warping function with three sub-functions defined. Two identical object processors 60 and 62 disposed on cards 36 and 40 are defined, each capable of performing a one-dimensional warp. The Y object processor 60 performs the column-by-column warp, and the X object processor 62 performs the line-by-line warp. A frame buffer 64 is used to store the intermediate image (warped in Y but not X) to allow the X object processor 62 access to row data rather than the column oriented data in the serial data stream used up to that point.

Magnitude and offset parameters, for both Y and X passes, essential to the implementation of the algorithm are passed to the Y and X axis processors 60 and 62 from the appropriate object controller at the frame rate. Line-by-line (column-by-column) computations of magnitude and offset must be handled by the axis processors themselves.

IMPLEMENTATION OF LINEAR WARP TECHNIQUE

Figure 34:
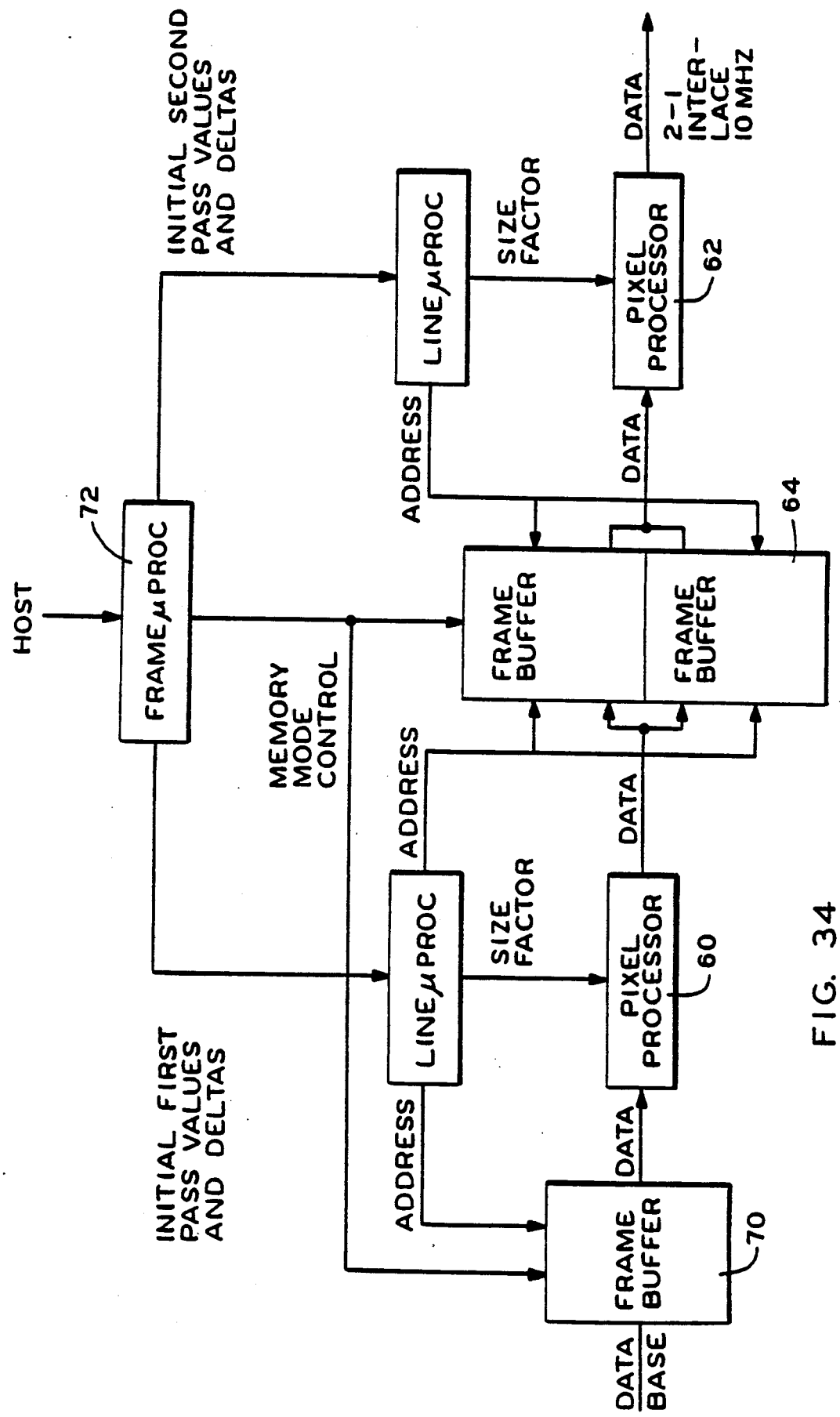
FIG. 34 illustrates two-pass warping organized in a pipeline configuration.

The two-pass technique is organized, as shown in FIG. 34, in a pipeline configuration as input memory 70, first-pass processor 60, intermediate memory 64 and second-pass processor 62. The intermediate memory is a double buffer so that the first-pass processor 62 can write its results in one buffer while the second-pass processor is reading its input from the other buffer. Both processing stages may be of identical hardware design.

There are three points of external communication in the subsystem. The input image memory 70 is loaded from an image data base and is a 10-MHz, 8-bit I/O port. The host has to pass sub-image coordinates and output corner coordinates to a controller 72. This may be a fast RS232 or a shared DMA port. The third port is the output image delivered as a 10-MHz, 8-bit, synchronized 2-1 interlace stream of pixels.

The host must set up the input image as shown in frame 25 of FIG. 30 and deliver the image corner points 1 to 4 indicated in the screen frame 26 of FIG. 30. The subsystem then performs the indicated transform on the supplied image until the host changes one or the other.

The control and processing inside the subsystem naturally partitions into three hierarchical stages, namely, the frame, line and pixel stages. The frame and line processing is lower bandwidth than pixel processing and can be accomplished with available 16-bit microcomputers. The pixel processing is very high data rate and requires custom designed hardware.

The frame level control involves setting up the memories, communicating with the host and initiating the line processors. Several computational tasks are carried out at the frame level. The access orientation of the input image is determined by finding the orientation which generates the largest intermediate image. This is indicated by the frame 27 of FIG. 30. There are four possible orientations and an output position and a size factor and associated deltas must be calculated and passed to the line processor of FIG. 34. For the second pass these calculations are somewhat more complex than for the first pass and, in addition, some screen clipping calculations must be carried out.

There are 33 milliseconds available to carry out the frame oriented calculations and, by using double integer arithmetic operations, these tasks require only about 15 milliseconds on, for example, a M68000. Thus, there is ample processing power in a single microcomputer to carry out these calculations and control the subsystem.

The line level processing increments the output position and size factor, perform clipping calculations on the output position, sets the address in the input and output memory and signals the pixel processor to begin processing. There are 63 microseconds available for this processing. It is estimated that at least 50 microseconds are required. This is close to the limit and two microcomputers may be required to assure performance of line computations for each pass.

A separate line level processor is required for each pass but only one frame processor is required. A total of five microcomputers may thus be needed. There is very little data storage required and programs are short for each process. Therefore, very little memory is required and all five processors can be fit on a single board.

Figure 36:
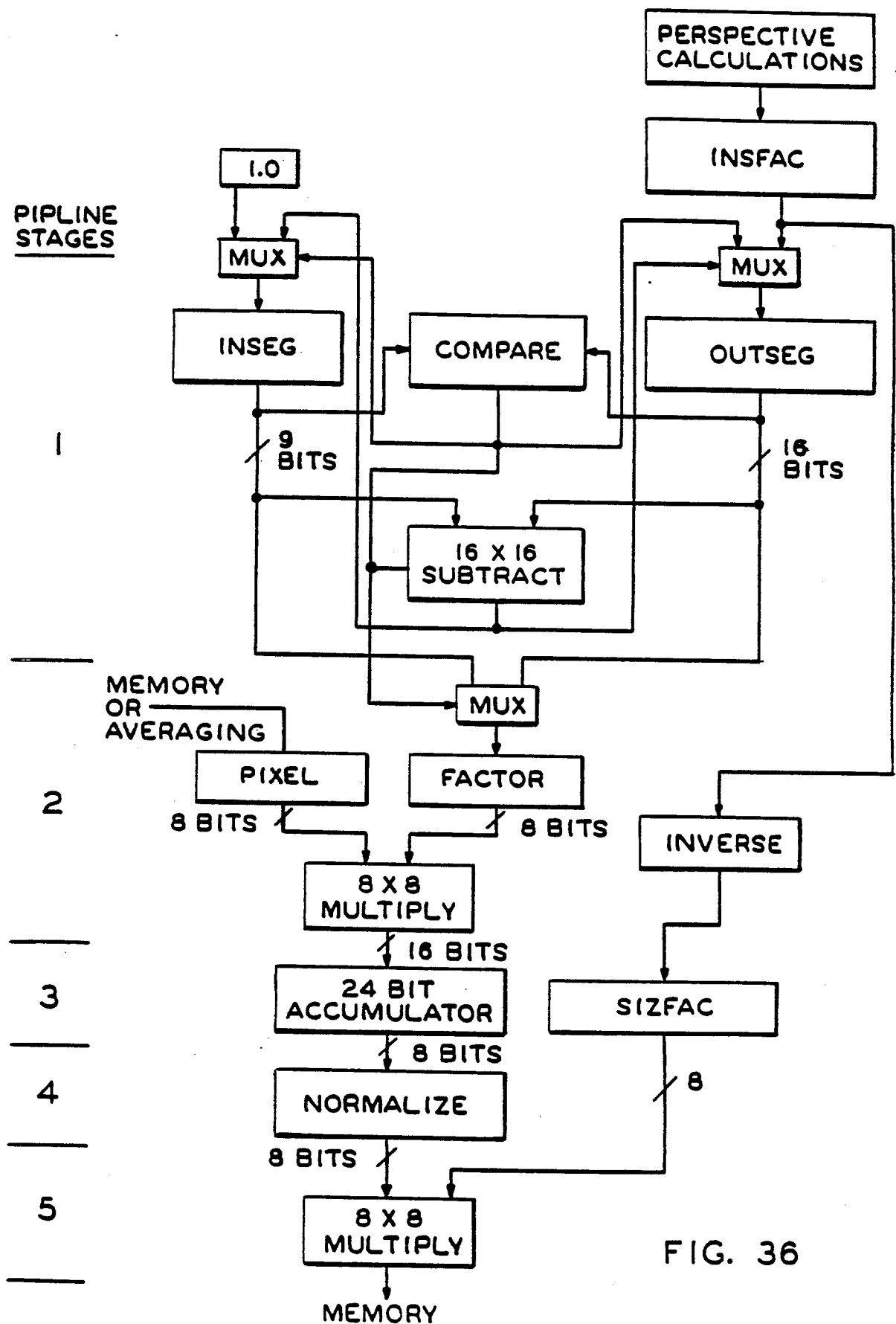
FIG. 36 shows a pixel interpretation processor for carrying out the process indicated in FIG. 30.

FIG. 36 illustrates a typical pixel interpolation processor for carrying out the interpolation process of consuming input pixels and generating output pixels. It implements the two-state loop of the interpolation technique which can be readily pipelined in hardware. Output pixels must be readily generated at a maximum rate of one every 100 nanoseconds. The algorithm may require two cycles to generate an output pixel; therefore, the pipeline must be capable of 50 nanosecond cycles. The processing will fit into a fast pipeline with minimum hardware.

There is a recursive coupling in the process which is accounted for in a single pipeline stage. This is the comparison of INSEG and OUTSEG. The use of one to scale the input pixel (INSEG) and the subtraction of one from the other based on the comparison generating a new value for one which is then compared again. The factor chosen for the scaling can be clocked into a register of the next stage and preserved; but the compare and subtract must occur in a single cycle in a single stage. This is illustrated in FIG. 36.

First-Stage Operation

If the image is being reduced in size, OUTSEG is smaller than INSEG and an output pixel is being completed. OUTSEG is stored into the factor register of the next stage and is subtracted from INSEG. The new value of INSEG is stored in its register. OUTSEG is reinitialized from INSFAC and the compare is set for the next cycle.

Conversely, if INSEG is smaller than OUTSEG, an input pixel is depleted. INSEG is stored into the factor register of the next stage and is subtracted from OUTSEG. The new value OUTSEG is stored in its register and INSEG is reinitialized to 1.0 and the pipeline stage is set for the next cycle. The remaining stages then follow in a straightforward manner.

Second Stage

The second stage multiplies the input pixel value by the selected scale factor. If an input pixel is depleted the next input pixel is clocked into the pixel register. The result of the multiplication is delivered to the next or third stage of the pipeline.

Third Stage

The third stage accumulates the scaled values of input pixels. If an input pixel is used up, the processing ends. If an output pixel is being completed, the accumulated value is delivered to the next stage and the accumulator is cleared to zero.

Fourth Stage

The fourth stage shifts the accumulator value to normalize the decimal position for input to the output scaling multiplier. This normalization is discussed in the subsection on arithmetic precision.

Fifth Stage

In the fifth stage, the accumulated value is multiplied by SIZFAC which is the inverse of INSFAC. This creates the value for the next output pixel. This value is then delivered to memory to be stored in the next output pixel location. Arithmetic Precision The interpolation is sensitive to arithmetic precision in both the output intensity values and their spatial orientation. Computer simulation has shown that values of INSEG and OUTSEG with S bits of fractionation are sufficient to ensure very high output image fidelity over a large range of transforms.

The value of INSEG is never greater than 1.0 and thus requires but 9 bits of representation. OUTSEG can be represented as 16 bits with 8 bits of fractionation. 5 bits. It is readily observed that the smallest of the two values is always chosen as the scale factor for the next stage. This means that there will be only scale factors of 1.0 or an 8-bit fraction thereof. A factor of 1.0 can be detected and treated as a special case by bypassing the scale multiplication and presenting the pixel value directly to the accumulator. This leaves only scale factors with fraction bits. An 8×8 multiplier will suffice for the scaling and the product, then, is a 16-bit value with 8 fraction bits.

The accumulator accumulates these values. Again, there are two possibilities. If INSFAC is less than 1.0 the relevant pixel bits migrate into the fractional portion of the product and only one accumulation occurs. On the other hand, if INSFAC is greater than 1.0 the relevant pixel bits will migrate into high-order bits and there may be several accumulations. The accumulator must therefore be 24 bits wide and contain 8 fraction bits.

The accumulator value is eventually scaled to the final output value by SIZFAC. Only 8 bits of this final scaling are needed. The 8 bits to the left of the decimal point are the desired bits. The possible values that can accumulate are directly related to the value of INSFAC and SIZFAC. Therefore, the value of SIZFAC is directly related to the range of possible values in the accumulator and the relevant bits of both SIZFAC and the accumulator which produce the desired 8 bits can be determined.

SIZFAC can be normalized so that its high-order bit is a 1. If the value is truncated to its 8 high-order bits and the position of the resulting decimal point noted, the resulting value might, for instance, have 6 fraction bits. Based on the value of SIZFAC then the relevant bits are picked out of the accumulator value which has 8 fraction bits. The value picked is the value with enough fraction bits to bring the total of fraction bits between. it and SIZFAC to 8. When the two numbers are multiplied together the 16-bit product has 8 fraction bits and the 8 high -order bits are the desired bits left of the decimal point for the output pixel value.

TWO-AXIS FAST MEMORY

The memory serves the pixel processors by delivering and receiving streams of consecutive pixels of a specified row or column. The line microcomputer will load the image row and column address into the memory address counters. It specifies whether the address is to be incremented as a row or column and whether read or write operations are to be performed. The memory responds to requests for the next pixel from the pixel processor. For each new line the memory is reset to a new row and column address by the line microcomputer.

Figure 37:
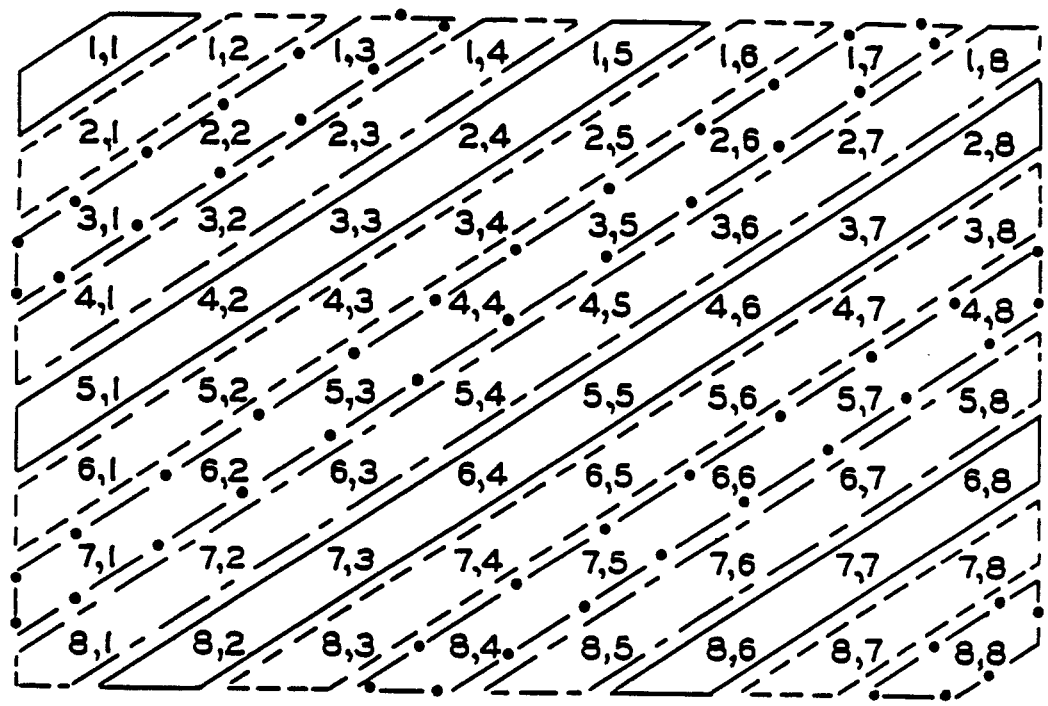
FIG. 37 illustrates spiral mapping of an image into memory for pixel processing.

The memory must respond to requests at a maximum rate of one every 100 nanoseconds. This speed is achieved more easily by a technique which involves organizing the memory in four banks of 8 bits each. In this manner, four pixels can be delivered or stored in a single memory cycle and pixels can be moved four times faster than the basic memory speed allows. As shown in FIG. 37, fast access in both rows and columns of the image is achieved by mapping the image into the memory spirally such that any four consecutive pixels of any row or column resides in separate memory banks.

IMAGE ADDRESS TO MEMORY ADDRESS MAPPING

Figure 39:
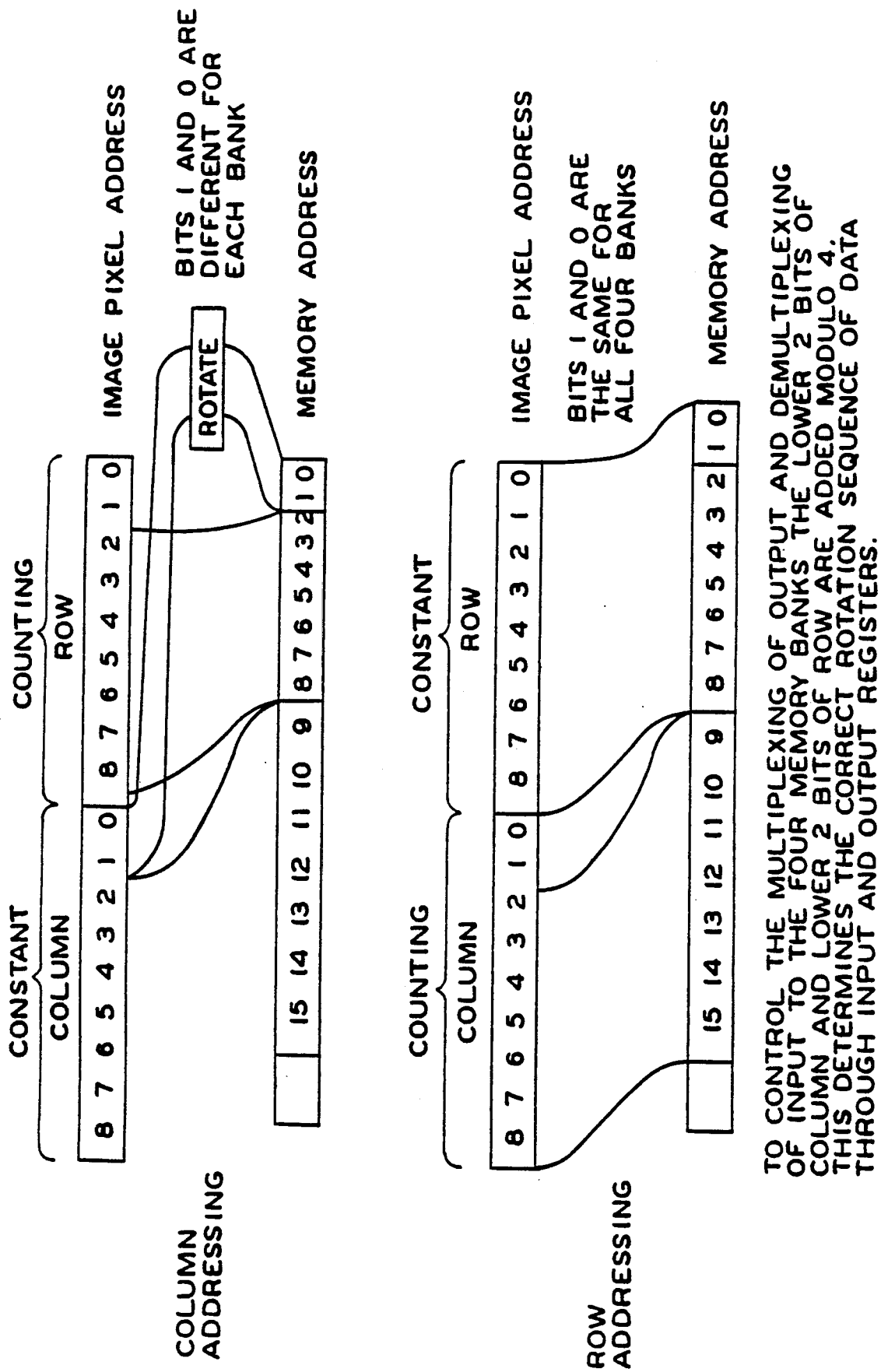
Figure 40:
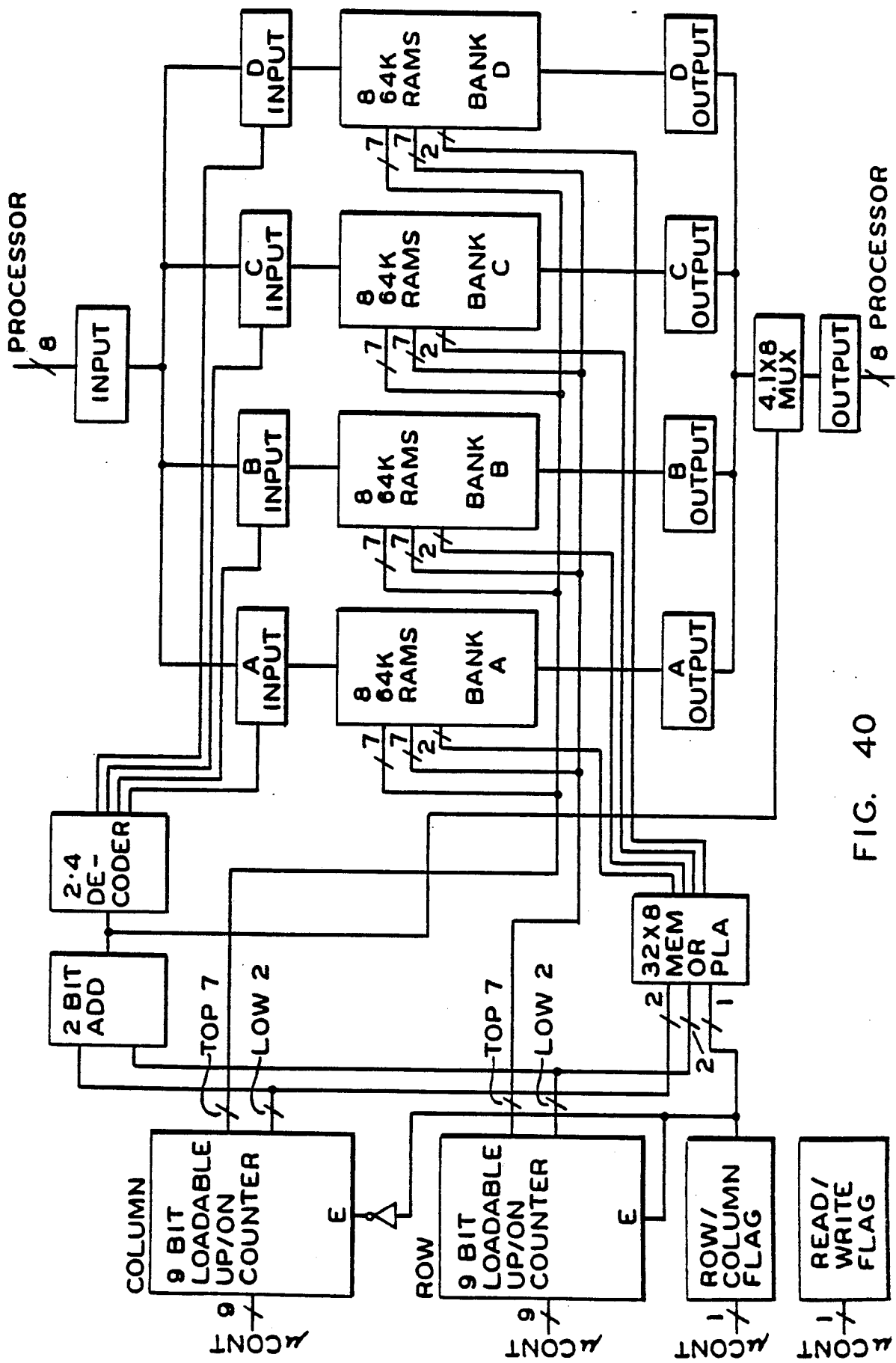

FIGS. 38–40 show examples of how the image address to memory address is mapped. The row and column image address is stored in up/down counters and mapped internally to a memory address. The mapping entails incrementing either the row address for column-oriented access or the column address for row-oriented access. The determination of the lower order 2 bits of the 16-bit memory address and the control of the rotating address orientation of the input and output registers for each memory bank are the more esoteric aspects of the address mapping.

The upper 7 bits of the 16 bit memory address comprise the upper 7 bits of the 9 bit column address. The next seven bits of the memory address are the upper 7 bits of the 9 bit row address. The lower 2 bits of the memory address are a function of the lower 2 bits of either the row or column address based on the row/column flag. For the row-oriented access mode the lower two bits of each bank are identical and are the lower two bits of the row address. For column-oriented access the lower two address bits are different for each memory bank and are rotated according to the lower two bits of the column address.

| Lower 2 Column Bits | LOWER 2 MEMORY BITS | | | |
|---|---|---|---|---|
| | Bank A | Bank B | Bank C | Bank D |
| 00 | 00 | 01 | 10 | 11 |
| 01 | 11 | 00 | 01 | 10 |
| 10 | 10 | 11 | 00 | 01 |
| 11 | 01 | 10 | 11 | 00 |

Control of the input-output registers is identical for both row and column access modes and is a function of the lower two bits of both row and column. The register address assignment rotates depending on the row or column being accessed. Considering only the lower two bits the zero pixel for a zero column is in Bank C, etc. The same is true for rows. This rotating register address can be implemented by assigning 0 to Bank A; 1 to Bank B, etc., and by adding modulo 4 the lower two bits of row and column addresses.

For each request from the processor the proper row or column address is incremented. Pixels are multiplexed out of output registers or into input registers. When the lower 2 bits of the incrementing address change from 11 to 00 a memory cycle is initiated to store four input pixels or read the next four pixels.

LARGE/SMALL CHANNEL PROCESSORS

As previously stated to construct a CGSI scene each object, surface, and special effect (OSSE) image pass through a processing channel. The size of each OSSE may range from a pixel to the entire screen. In most scenes, small (e.g. an area less than 1/16 of the screen) objects out number large objects (e.g. an area greater than 1/16 of the screen). The processing channels are designed with the capability to operate on an entire frame. These are called large channel processors. The use of a small fraction such as only 1/16 of a frame is very inefficient. Three choices exist: run inefficiently with parallel large frame processors, build a special purpose small OSSE processor, or pass a plurality of, say 16 OSSE's through a large channel processor. The last choice, of course, is by far the most practical.

Figure 41:
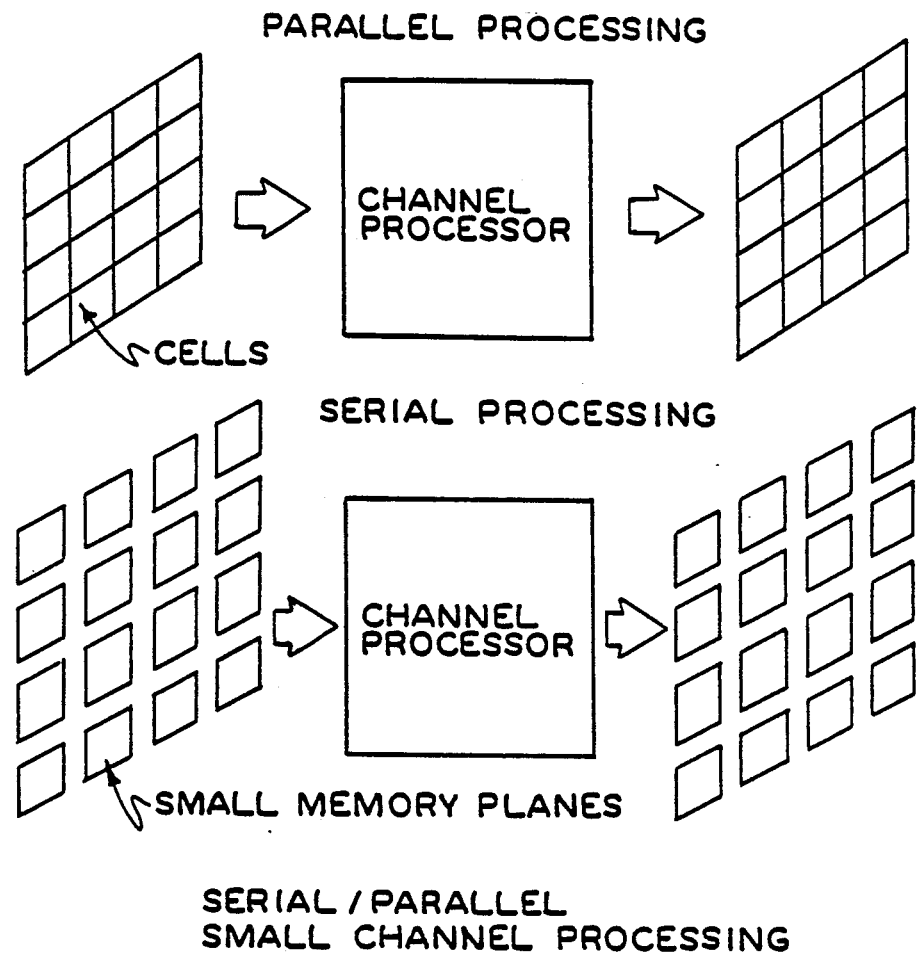
FIG. 41 illustrates both serial and parallel object, surface and special effect channel processing.

A plurality of small OSSES may be passed through the large channel processor in either a parallel or serial manner as shown in FIG. 41. In the parallel approach, 16 small OSSE's are loaded in one memory plane. For each line (column) pass, the processor changes factors four times. The output of the processor is loaded in an output memory plane. The OSSEs are positioned within their cell of the memory plane. An X and Y screen address of the cell and the positions of the OSSE within the cell determines the position of the image for the scene construction module. The serial approach passes entire small images through the processor first in Y then X. The serial method uses 16 small input and output memory planes.

As previously stated, one inherent prior art CGI imaging problem involves edge aliasing or the lack of edge feathering or smoothing in the transition from object to background which leads to cartoonish representations. One distinct advantage of the continuous interpolation system of the present invention is the elimination of edge aliasing in the edge details of the pictorial images. The pictorial images produced, as by photography, are realistic reproductions of objects where the boundary transitions between each object and its background are not step functions or sudden changes but rather gradual or feathered transitions. The interpolation characteristics of the present invention faithfully reproduce these precise intensity changes which occur between the object and the background so as to portray softened or smoothed edges which enable high fidelity. This is in sharp contrast to the decidedly large jumps in intensity levels between adjacent pixels which characterize the sharp edges and yield the cartoonish effect referred to above.

PERSPECTIVE WARP TECHNIQUE

In the case of linear warping, the advantage of the interpolation technique is that most of the highly variable calculations can be performed at the frame level where there is plenty of time available. The line calculations are very simple and the pixel interpolator need be set up with but a few parameters and turned loose on a line of pixels. The linear interpolation approach achieves the correct outline for perspective transform but the mapping of the internal data is not correct because it is nonlinear.

This nonlinearity is manifested in the continuous interpolation process in the form of a continuously changing size factor for each new output pixel. Thus, with the linear transform the value of INSFAC is constant over an entire column or line; whereas with the perspective transform the value of INSFAC may be different for each output pixel.

It is desireable that the function for the changing value of INSFAC or the changing size factor be characterized with simple enough computations that they may be embedded in low cost real time hardware. This may be accomplished by a two-pass operation in which the vertical and horizontal passes are considered in terms of vertical planes and horizontal planes instead of just rows and columns. The first pass utilizes a series of projections of each object column onto a vertical plane and the second pass utilizes a series of intersections of the object with planes projected from the origin through each line on the screen.

Figure 44A:
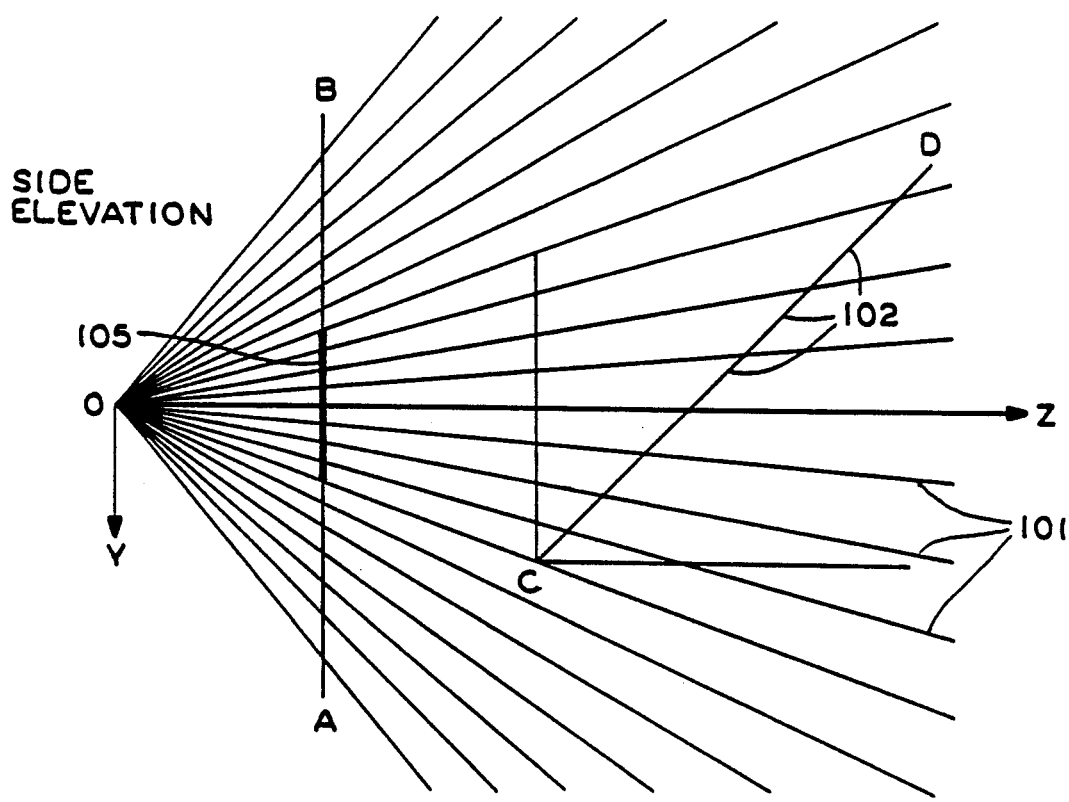
FIGS. 44A and 44B illustrate the respective vertical and horizontal mapping of object lines on a screen relative to an observed point of view.
Figure 44B:
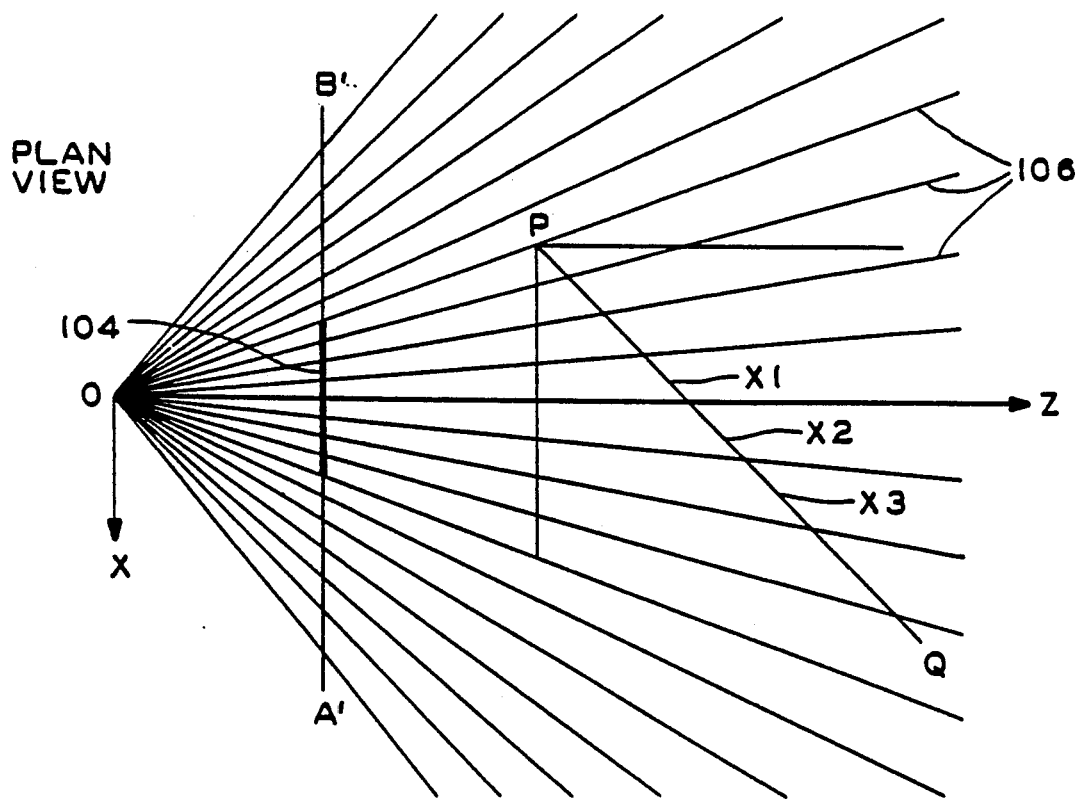

The computation related to the plane is illustrated in FIGS. 44A and 44B. The origin eye of the observer at O becomes the origin of a coordinate system. The line AB represents the viewing screen. The line CD is a line representing an object in space behind the screen. The lines emanating from the origin depict line-of-sight rays intersecting the screen AB at one pixel increments. These rays also intersect the object line CD. The point where a ray intersects the object line maps onto the screen at the point where that same ray intersects the screen.

Therefore the portion of the object line between any two ray intersections is the portion of the input image that maps to the screen pixel between the intersection of those two rays and the screen. The length of the segment of CD between any two rays is the number of input pixels, that contribute to the corresponding output pixel, or the value of INSFAC.

To obtain the value of INSFAC for each output pixel for the interpolation power processor it is necessary only to trace rays from the beginning of the object line to the end, solve for the intersection of each ray, and find the distance between intersections.

The interception equation (FIG. 45) is quite simple and contains constant terms, for the most part. The ray line passes through the origin and is characterized by its slope which depends on the screen distance and the screen coordinate. The screen coordinate is the only value of the equation that changes as the ray is traced.

The object line equation is characterized in terms of its end points. MOBJ is defined as the slope of the line. The interception equation solves for the Z coordinate of the intersection of the two lines. A subtraction of Z coordinates of the previous intersection yields the horizontal distance between the two intersections.

It is seen in FIG. 44A that the object line CD forms a right triangle within the coordinate system and each intersection segment forms a similar right triangle. The ratios of the length CD to the horizontal distance between C and D is the same as the ratio of each intersection segment to its horizontal distance. This constant ratio RATIO may be determined directly from the endpoints of the line CD and the length of the input line and may be applied to the horizontal distance between intersections to determine the lengths of the segment and the next value of INSFAC.

The computation consists of applying the changing screen coordinates propagating through the equation. As shown in FIG. 46, this readily lends itself to pipelining in hardware. The pipeline delivers a new value of INSFAC to the interpolation processor for each new output pixel.

The correct object line CD for each column and each row may be charcterized by projections and intersections of the object in 3 space onto planes. This is accomplished by a two-pass procedure.

Figure 47:
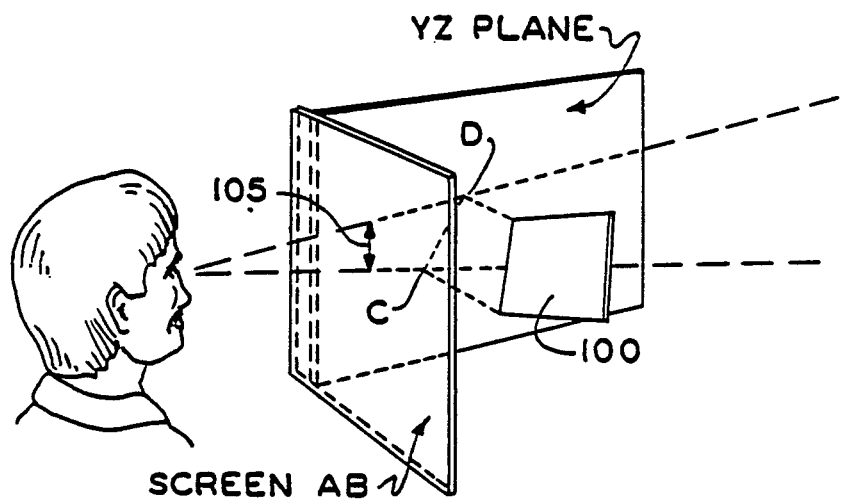
FIG. 47 illustrates a first pass vertical object line projection.

The first pass which is illustrated by FIG. 47 utilizes a vertical YZ plane and projections of columns of the object onto this plane. This may be accomplished by determining the YZ coordinates of the top and bottom of each column of pixels in the object image in 3 space. The YZ coordinates of these two points in each relevant column are the endpoints of the object line in the YZ plane to be traced with rays in the interpolation process as represented in FIG. 44A.

Figure 48:
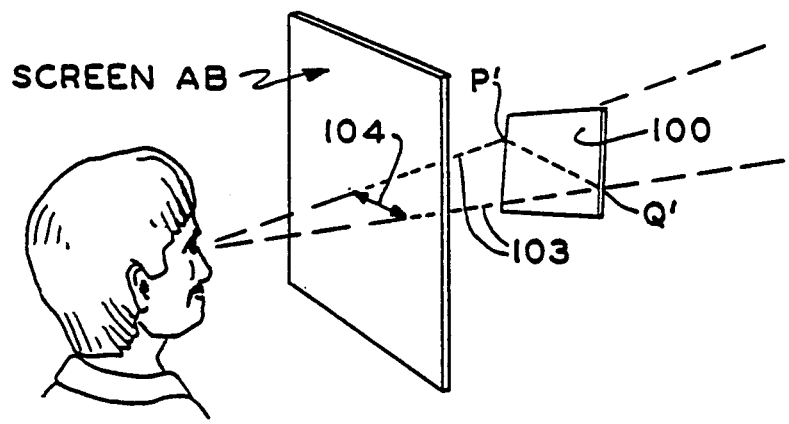
FIG. 48 illustrates a second pass horizontal object line projection.

The second pass illustrated in FIG. 48 and FIG. 44B utilizes planes projected from the origin through each successive line on the screen. The intersection of that plane and the object again defines the line for the ray tracing process. This line is determined by its endpoints in the plane and these endpoints are found by finding the intersection with the plane of the two 3-dimensional lines defined by the edges of the object in 3 space.

Figure 43A:
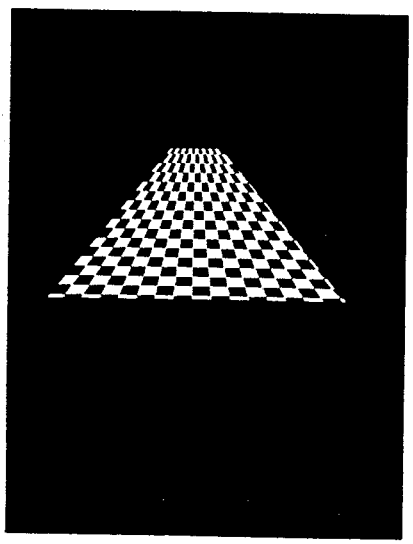
Figure 43B:
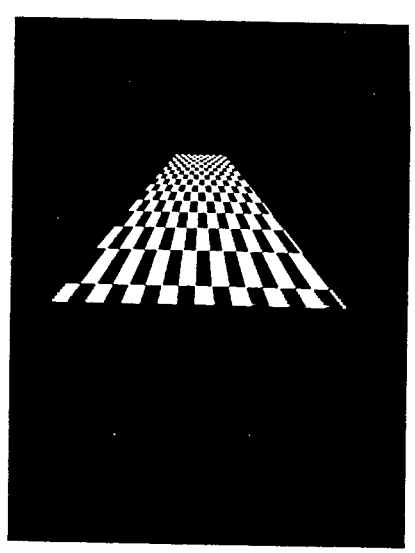

The two pass procedure utilizing the ray tracing along projected object lines to drive the continuous interpolation process achieves a mathematically correct and high fidelity perspective transform of a plane image onto a viewing screen. This is illustrated for both the linear and perspective situations in FIGS. 43, 44A and 44B.

The treatment of images in perspective has been described in technical terms. As a further aid to more fully understanding the perspective warping of images, the following explanation is provided.

It will be remembered that any frame, whether it is to be portrayed on the screen either in linear or perspective form, is stored in memory in the same way. The data for the frame is a 512×512 row and column pixel array with associated intensity values.

For the perspective portrayal the FOV program calculates the coordinates of the four corners of the frame in 3-space which is the coordinate system which has the receptor of the scene recognition system, which may be an observer, as the origin. An example of a frame 100 in 3-space is shown in FIGS. 47 and 48. Referring to FIGS. 44A and B and FIGS. 47 and 48, the screen AB in front of origin or the eye 0 of the observer is an XY plane a predetermined distance from the origin.

As shown in FIG. 47, the 512 columns of the frame 100 are sequentially projected to a line CD in the YZ plane which plane does not have an orientation relative to the X-axis. In each case the line CD (referred to as an object line) is a leg of a right triangle for which the respective frame column is the hypotenuse. The characteristics of interest of each object line CD are its end coordinates in the YZ plane in which it appears and such coordinates are calculated and stored.

Each of the 512 object lines CD is subjected to a vertical pass operation as indicated in FIG. 44A and 47 which is in a YZ plane, which contains the origin 0. Scan or ray lines 101 extend from the eye or origin 0 through screen AB, there being one pixel spacing between each pair of adjacent rays. The rays 101 also intersect the object line CD as indicated.

Object line CD was derived from a frame column having 512 pixels and for purposes of calculation is considered to have a corresponding length scaled to 512 units. The segments 102 of the line CD formed by the intersecting rays 101 are of unequal lengths and such lengths, based on a total length of 512 units for line CD, are calculated by equations as referred to above and as set forth in FIG. 45.

With the lengths of the segments 102 known, the total assumed length of 512 units for the line CD are prorated relative to the individual segments. This step provides a pixel ratio between each segment 102 and the corresponding line segment of screen line AB and this ratio is the INSFAC value for each segment 102. As the lengths of segments 102 vary relative to each other, the values of INSFAC for the respective segments varies correspondingly.

Using the stored pixel intensity values of each frame column, the sizing and interpolation process explained above in connection with the linear warp is used to obtain the corresponding line 105 in screen AB for the intermediate image.

Figure 42:
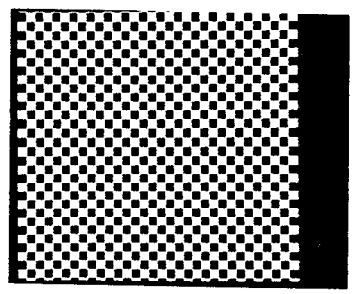
FIGS. 42 and 43 illustrate the warping of images in both linear and perspective in accordance with techniques of the present invention.
Figure 42A:
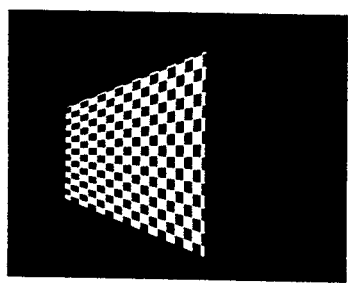
Figure 42B:
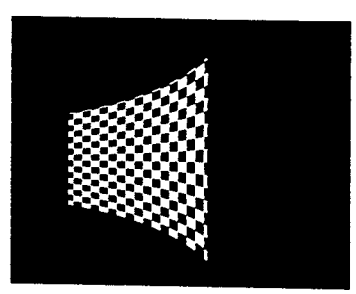
Figure 42A:
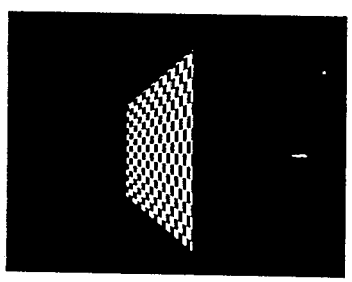
Figure 42B:
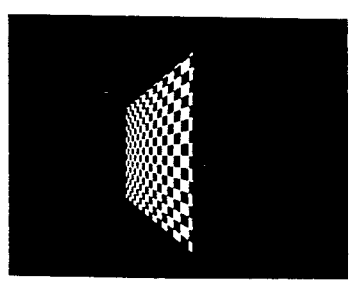

Repeating the above process for each of the 512 object lines CD results in an intermediate perspective image as illustrated in FIG. 42 in which 512 vertical lines corresponding to the columns of frame 100 comprise correctly sized and positioned vertical components of the final image.

In the second pass, illustrated in FIG. 44B and 48, planes 103 radiating from the origin extend through rows 104 of the screen AB which rows are spaced one pixel apart. Planes 103 intersect frame 100 in lines of intersection PQ which are indicated in FIGS. 44B and 48 and to some extent are analogous to the lines CD of the vertical pass.

The lines P'Q' may be considered second pass construction lines because each of them is projected to the horizontal XZ plane which contains the origin or eye 0 of the observer. This is the plane XZ shown in FIGS. 44B and 48 where the projected construction lines P'Q' are identified as lines PQ and are referred to as second pass object lines.

The width of the intermediate image corresponding to each construction line P'Q' is (or is assumed to be) equal to the length of the second pass object line PQ. The line 104 of screen AB, which is a projection back from line P'Q', is a final output line. A line through the intermediate image at the same level as a line P'Q' will have to be mapped onto the corresponding screen line 104.

Referring to FIG. 44B, vertical planes 106 through the origin and screen AB (spaced one pixel apart), and one of the second pass object lines PQ, divide the line PQ into a series of segments X1, X1, X3, etc., which inherently are of different sizes.

The length of line PQ corresponds to the width of the intermediate image at the vertical level of line 104, (FIG. 48). The pixel columns of the intermediate image are equally spaced because the first pass operation did not disturb the horizontal spacing of the columns of the input frame 100.

The segments X1, X2, etc. of each second pass line PQ each represent a number of intermediate image pixels corresponding to their respective lengths such that the pixels are pro rated with respect to them. As the spacing of the rays 106 through line 104 is at a one pixel width, the ratio of the number of pixels represented by each of the segments X1, X2, etc. relative to the corresponding one pixel spacing in line 104 of screen AB is equal to INSFAC which may have a different value for each of the segments X1, X2 etc. of line PQ.

Using the stored pixel intensity values of each line in the intermediate image, the sizing and interpolation process explained above in connection with the linear warp algorithm is used to obtain the corresponding line 104 in screen AB and all the other lines thereof for the final image.

ALTERNATIVE ALGORITHM

Figure 49:
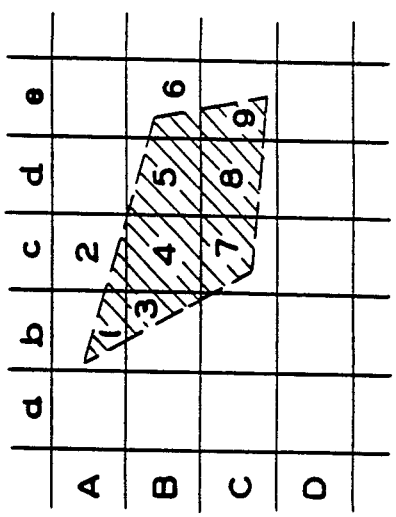
FIG. 49 illustrates an output pixel corresponding to an alternate processing algorithm.

An alternative system may be employed where higher resolution must be retained as objects approach the viewer. This approach assumes that the input image resides in a memory addressable as a grid in which the grid intersections are the points at which input image intensities are known. Each output pixel may then be projected into the grid of the input image. The relative intensity of the output pixel is computed from the region occupied by the projected output pixel. In FIG. 49, a projected output pixel is represented by the polygon formed by the dashed lines. The intensity computed for an output pixel may be an area weighted average of the smaller regions forming the inside of the projected output pixel.

This procedure will be explained for one typical projected output pixel in terms of FIG. 49. In the figure, the rows of the input image grid are identified by the letters A, B, C, D, and the columns by the letters a, b, c, d, e. The smaller grid regions forming the inside of the projected output pixel are identified by the numbers 1, 2, 3, 4, 5, 6, 7, 9. Each smaller region is bordered by solid and/or dashed lines. Region 1, for example, is bordered by the upper and leftmost dashed lines and by the solid lines forming the bottom of row A and the right edge of column b.

The intensity of the output pixel is the area weighted average, in which $$\text{output} = \sum_{j=1}^{9} (\text{intensity}_j)(\text{area}_j)$$

where intensity$_j$=(corner intensities for each smaller region j), and area $j$ is the area of a smaller region expressed as a percentage of the total projected output pixel's area enclosed by the dashed polygon.

The corner intensities for a small region are bilinear interpolations from the four nearest grid corners of the input image. Using Region 1 as an example, the intensity at the upper left corner of Region 1 is computed as the bilinear interpolant of the four corners of the square formed by Row A and Column b. The intensity of the upper right corner of Region l is the bilinear interpolant of the four corners of the square formed by Row A and Column c. The intensity of the lower right corner of Region 1 is the bilinear interpolant of the four corners of the square formed by Row B and Column C. The intensity of the lower left corner of Region 1 is the bilinear interpolant of the four corners of the square formed by Row B and Column b. These intensities for the Region 1 corners are averaged to form intensity$_j$ where j=1. This is the value multiplied with area$_j$ to form the first of the nine products summed to compute the projected output pixel's intensity. In this manner, the corner intensities for each small region are similarly interpolated then averaged to produce a single value to multiply with each region's area expressed as a percentage of the large region. These products may then be summed to compute the output pixel intensity.

SCENE CONSTRUCTION

A scene construction module is provided which assembles the individual objects being processed into a single scene or frame with each object positioned appropriately and viewed according to whether or not it is occluded by other objects.

Figure 50:
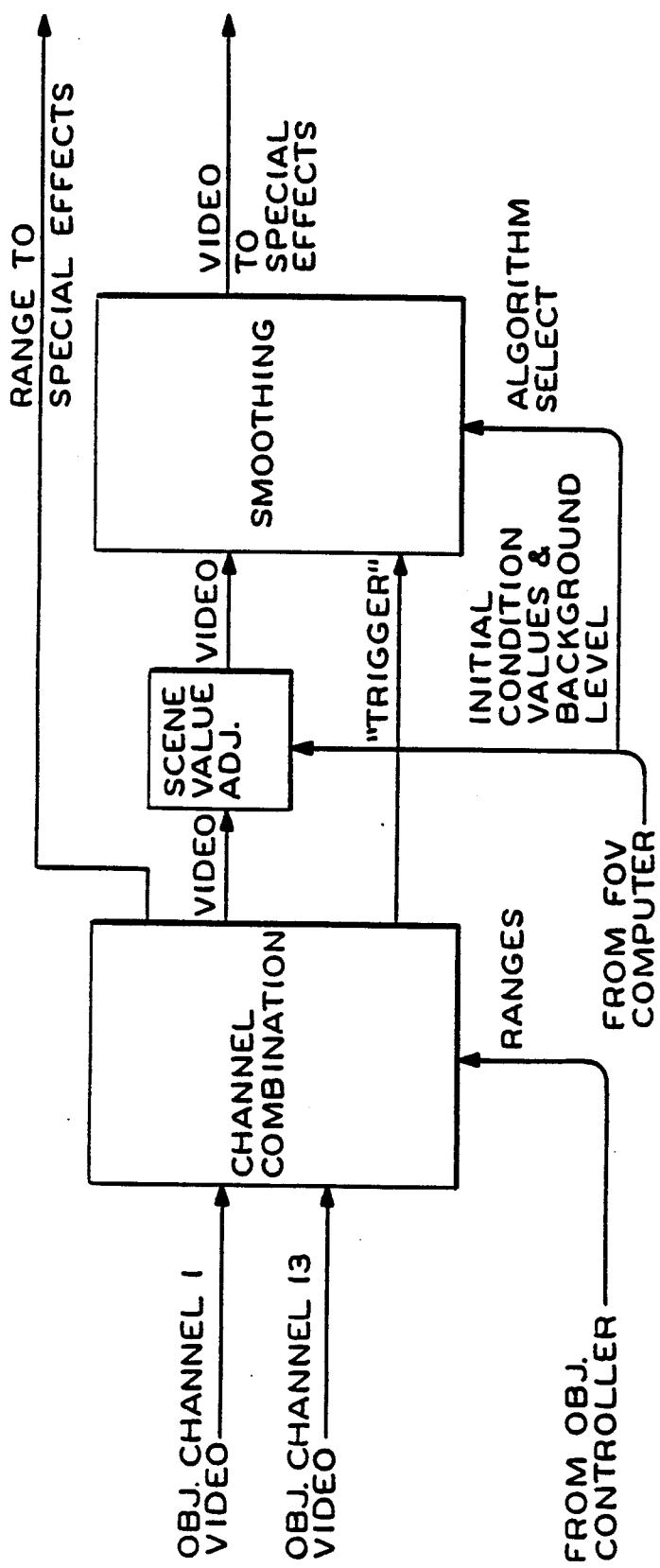
FIG. 50 is a block diagram of a scene construction module for assembling the individual objects for processing into a single scene.

The block diagram oft he scene construction module shown in FIG. 50 indicates those subfunctions necessary to implement all of the generic tasks required of this function. The following sections will describe each of these subfunctions in more detail.

Figure 51:
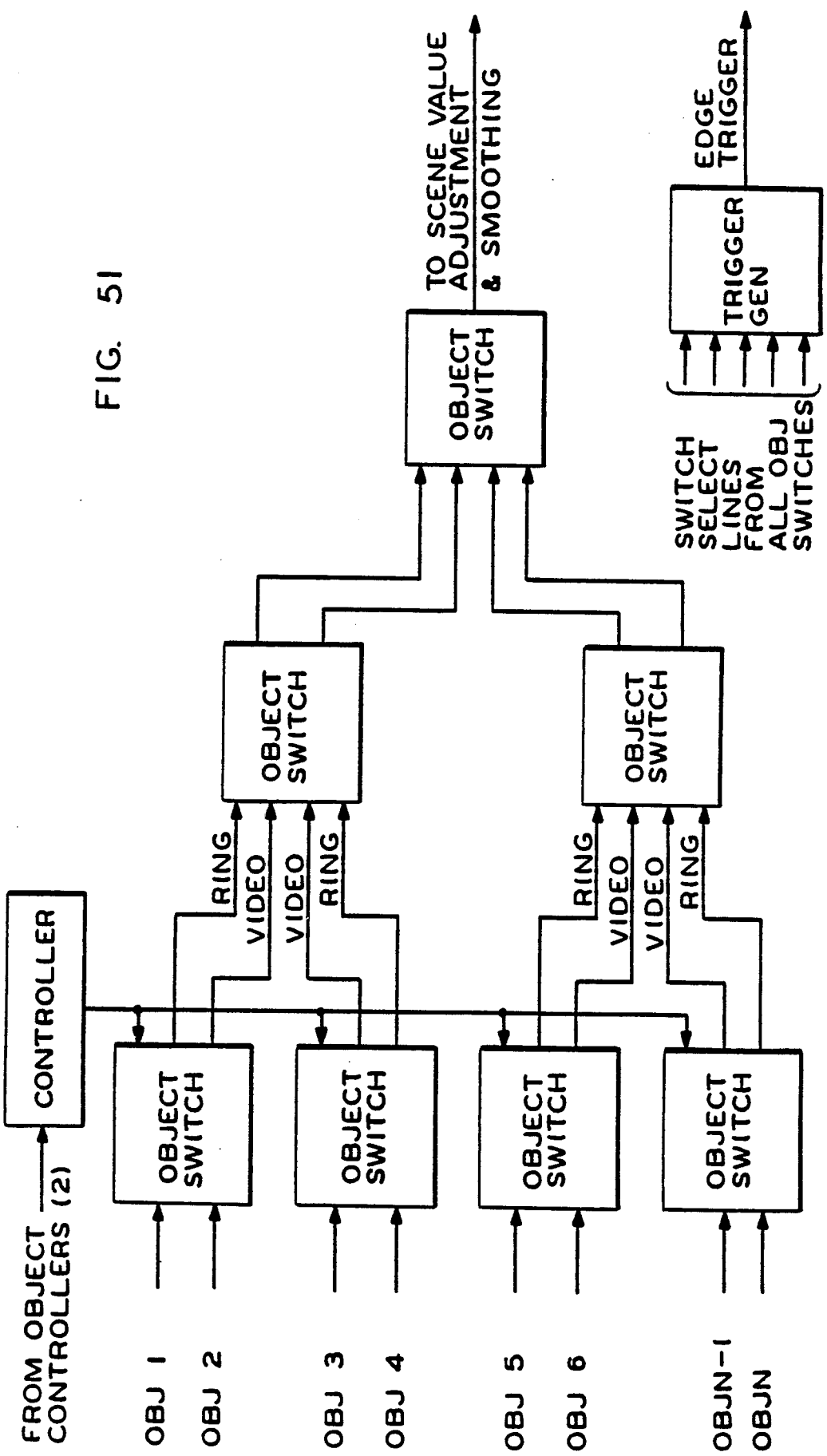
FIG. 51 illustrates a channel combiner for combining video data from multiple sources on a pixel-by-pixel basis to form the final composite scene.

Channel combiner 80 forms the heart of the scene construction module, for it is here that the video data from multiple sources or channels is combined on a pixel-by-pixel basis to form the final composite scene or picture. The term "channel" is used here to refer to a source of video data. Of course, each of these sources may be expanded to include one or more colors. As shown in FIG. 51, the channel combiner 80 accepts video from the surface and object channels. The channel combiner also accepts range information for each displayed object from the object and software controllers as indicated in the block diagram of FIG. 3. The channel combiner outputs a obannel of video data and a "trigger" signal to a smoothing input 82 which performs the shoothing subfunction.

A channel combiner implementation is presented in FIG. 51. Three basic elements are defined to implement channel combinations which are the object switch, the serial-to-parallel interface (S/P—I/F), and a trigger generator 84.

As shown in FIG. 51, the final object switch element 85 accepts video data from two channel sources, and range information from either the surface and object controller (via the serial-to-parallel interface) or the previous object switch. The object switch then outputs on a pixel-by-pixel basis the selected video channel and the appropriate range of that channel. The selection basis can be termed "nearest occupied" in that the video output is that of the object closest to the viewer that actually has non-zero pixel data. One single range value is used to describe both two-dimensional objects and three-dimensional objects. Object data is assumed to be embedded in a "field of zeroes." Each object switch in the array also outputs a "switch select signal" which is input to the trigger generator 84.

As shown in FIG. 51, trigger generator 84 accepts the "switch select" signals (the gating network output which also controls the range and video select muxes in the switch) from all of the object switches in the array. The output of the trigger generator is a single "trigger" signal which is used by the smoothing function 82 to control start of smoothing. Characteristics of the signal generator include (1) all changes in "switch select" signal inputs which affect the video output to the display must cause the "trigger" signal to activate, and (2) the throughput delay occasioned by the number of pipeline stages of the trigger generator must match the delay of the video path to the smoothing subfunction.

Scene value adjustment is performed by a scene value adjustment unit 86 which is used where scene-wide intensity corrections are required. Such corrections may be applied to compensate for day/night lighting, haze, rain, etc. These are typically initial conditions, or very slowly changing conditions. The scene value adjustment accepts video data from the channel combiner 80 and intensity correction values from the FOV computer. Output video from this subfunction is applied to the smoothing subfunction.

The smoothing subfunction performed by the smoothing unit 82 is used to simulate edge characteristics of the sensor. An edge refers to any adjacent pixels on a display line where a boundary exists. Such boundaries include those defined by objects overlaying other objects, or the transition from background to object. While several different types of edge smoothing algorithms may be used, a two-to-eight pixel process using Gaussian pixel weighting is preferred.

SPECIAL EFFECTS

Figure 52:
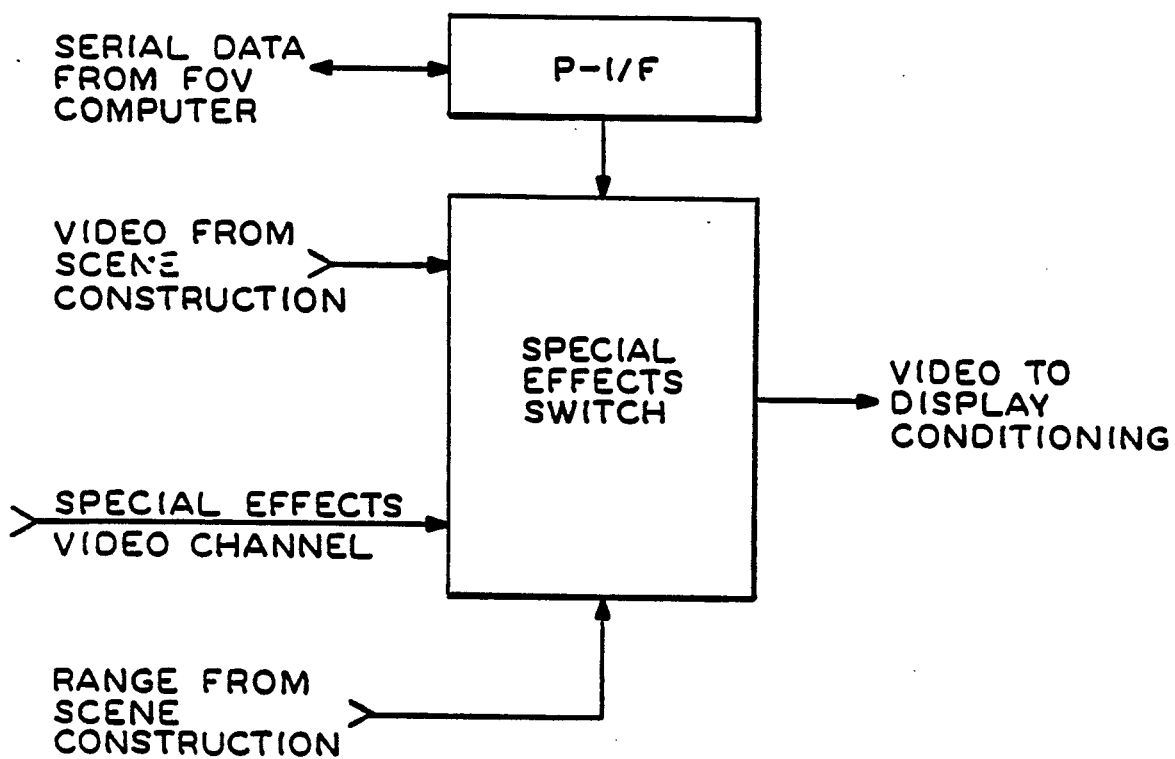
FIG. 52 shows a block diagram of the special effects function performed by the special effects unit 12 indicated in the block diagram of FIG. 3.

The special effects function performed by the special effects unit 12 may add translucent smoke, haze, or dust into the scene. These effects also have a range and may appear ahead of or behind other objects in the scene. A block diagram of the special effects function is shown in FIG. 52. Two subfunctions are necessary to implement this function, namely, a serial-to-parallel interface (S/P-I/F) and a special effects switch 88.

The S/P-I/F performs its function by accepting serial data (in this case from the FOV computer) and loading parallel range data into the range register of the special effects switch.

The special effects switch 88 is quite similar to an object switch. A "nearest occupied" algorithm may still be used to select the range value passed on to the next stage and influences how the channel i and channel i+1 videos are combined. The actual combination is not a simple switch implemented by a mux in the object switch but is an arithmetic combination which is influenced by the "nearest occupied" channel decision and a control or select signal from the FOV computer. The actual combination method is probably similar to the equation $Y=ai+b(1+2)$ or $bi+a(i+1)$.

The embodiments of the invention in which an exclusive property or right is claimed are defined as follows:

1. A method of mapping in a 3D coordinate system of 2D input images of views of objects stored in a data base to output images in a moveable rectangular viewing plane having a recatngular column and row pixel matrix, said system having a main axis extending normal to said viewing plane and having a viewing point thereon in spaced relation to said viewing plane, said method comprising the steps of:

representing each of said 2D images as a rectangular matrix of pixel intensity values arranged in columns and rows of pixels and having corner coordinates;

establishing a rectangular pixel matrix of each of said stored 2D images;

computing four corner coordinates for an output image in said viewing plane corresponding to said corner coordinates of any selected one of said 2D images;

making tow orthogonal passes wherein said first pass is over said input image to form an intermediate image having columns and rows of pixels and corner coordinates determined by said computed four coordinate corners of said output image, to form said output image with columns and rows of pixels and corner coordinates determined by said computed four coordinate corners of said output image;

making line transformations in said first pass wherein said input image columns are converted to said intermediate image columns with said intermediate image columns having lengths derived from said input image columns establishing respective ratios defining the lengths of said input image columns relative to said intermediate image columns;

making line transformations in said second pass wherein said rows of said intermediate image are converted to said output image rows on said viewing screen with said output image rows having lengths derived form said intermediate image rows establishing respective ratios defining the lengths of said intermediate image rows relative to said output image rows;

calculating and forming for each of said line transformations from said ratios, the number of input pixels required respectively from said columns of said input image and said rows of said intermediate image to create output pixels respectively for said intermediate image columns and for said final image rows;

mapping aid input pixels sequentially and fractionally to said output pixels for each of said line transformations; and summing and averaging said intensity values of said input pixels corresponding to each said output pixel and respective accruing composite values so obtained to said output pixels.

2. A method of linearly mapping a rectangular digital input image having columns and rows and corner coordinates, and represented as a pixel matrix of intensity values, to any predetermined quandrilateral having columns and rows and corner coordinates, comprising the steps of:

performing sequentially two orthogonal scanning passes of said input image wherein said first pass forms from said input image an intermediate image having columns and rows of pixels and corner coordinates and said second pass forms an output image having columns and rows of pixels and corner coordinates from said intermediate image;

performing line transformations during said first pass whereby said columns of said intermediate image correspond to said columns of said input image and have lengths and positions determined from said coordinates of said quadrilateral;

performing line transformations during said second pass whereby said rows of said output image correspond to said rows of said intermediate image and have lengths and positions determined from said coordinates of said quadrilateral;

calculating for each of said line transformations (1) the vertical ratios of the respective lengths of said columns of said input image relative to said columns of said intermediate image and (2) the horizontal ratios of the respective lengths of said rows of said intermediate image relative to said rows of said output image;

calculating a pixel ratio for each of aid line transformations from said vertical and horizontal ratios to determine respectively, for each of said line transformations, the number of said input image pixels required to create said intermediate image pixels and the number of said intermediate image pixels required to create said output image pixels and calculating, for each of said created intermediate and output pixels, an average intensity value from the intensity values of said input and intermediate pixels respectively; and mapping said input pixels sequentially and fractionally to said intermediate pixels and mapping and intermediate pixels sequentially and fractionally to said output pixels for each of said line transformations.

3. A method of mapping a digital input image to a viewing screen which is moveable in a 3D coordinate system and wherein said image comprises columns and rows of pixels representing a matrix of pixel intensity values in said system, said system having an observation point on a main axis thereof and a viewing screen having a format with columns and rows extending normal to said axis and spaced from said observation point, said system defining a vertical reference plane parallel to said main axis and extending normal to said viewing screen, comprising the steps of:

projecting sequentially and orthogonally said columns of said input image to said reference plane to form first pass object lines in said reference plane;

processing each line of said first pass object lines by projecting divergent lines form said observation point to said each line of said first pass object lines to define an intermediate vertically extending image column line in relation to said viewing screen having equal line segments of a length at least equal to one pixel length, said divergent lines intersecting said each line of said first pass object lines and resulting in corresponding first pass line segments thereof between said divergent lines having respective lengths corresponding to the number of said pixels separating adjacent one of said divergent lines;

calculating pixel ratios of said first pass line segments relative to corresponding ones of said line segments of said intermediate image column line;

mapping pixels respectively from said first pass line segments to corresponding ones of said line segments of said intermediate image column line;

projecting divergent planes from said observation point through said rows of said viewing screen having separation of at least one pixel length in said screen each of said divergent planes intersecting said screen to form a final image row line and intersecting said input image to form a second pass object line;

processing each said second pass object line in each of said divergent planes by projecting second pass divergent lines form said observation point through said columns of said screen having a separation of at least one pixel in said screen, said second pass divergent lines intersecting each said second pass object line to form second pass line segments thereof and intersecting said screen to form horizontally extending correctly positioned final image rows, said second pass line segments having respective lengths corresponding to the number of said pixels separating adjacent ones of said second pass divergent lines;

calculating pixel ratios of said second pass line segments relative to corresponding line segments of said final image row; and mapping pixels respectively from said second pass line segments to corresponding line segments of each said final image row.

4. A method for the linear position mapping of input pixels from an input pixel line in an input image to output pixels in an output pixel line in an output image, comprising the steps of:

(a) Determining the corresponding starting and stopping points for said lines and the size factor defined as the ratio of the length of said input line to the length of said output line, said ratio also being equal to the fractional number of consecutively arranged ones of said input pixels required to form the first one of said output pixels;

(b) beginning at the start of said input pixel line and sequentially feeding consecutively available pixels therefrom until a current number at least equal to said ratio is reached;

(c) feeding a pixel to said output pixel line and finding the current fractional pixel difference between said current number and said ratio;

(d) returning to said input pixel line and, starting with the next available pixel, continuing to sequentially feed consecutive available pixels therefrom, the number of which are added to said current difference until a new current number at least equal to said ratio is reached; and (e) returning to step (c) to continue the process until there are no more available pixels in said input pixel line.

5. A method for linear position mapping of input pixels from an input pixel line in an input image to output pixels in an output pixel line in an output image, comprising the steps of:

(a) determining the corresponding starting and stopping points for said lines and the size factor defined as the ratio of the length of said input line to the length of said output line, said ratio also being equal to the fractional number of consecutively arranged ones of said input pixels required to form one of said output pixels;

(b) beginning at the start of said input pixel line and sequentially feeding consecutively available pixels therefrom;

(c) calculating a sum by incrementing an initial value by one upon the said feeding of each said consecutive available pixel until a current sum at least equal to said ratio is reached;

(d) feeding a pixel to said output pixel line and finding the current difference between said current sum and said ratio when the current sum is at least equal to said ratio;

(e) returning to said input pixel line and, starting with the next available pixel, continuing to sequentially feed consecutive available pixels therefrom and incrementing said current difference until a new current sum at least equal to said ratio is reached ; and (f) returning to step (d) to continue the process until there are no more available pixels in said input pixel line.

6. A method according to claim 4 wherein said input pixels have intensity levels and, in each case where said fractional number of input pixels are required to form one of said output pixels, corresponding fractions of said intensity levels of said fractional pixels are summed and averaged in such a manner as to provide a desired intensity level for the corresponding one of said output pixels.

7. A method for nonlinear position mapping of input pixels from an input pixel line in a input image to output pixels in an output pixel line in an output image, comprising the steps of:

(a) determining (1) the corresponding starting and stopping points for said lines, (2) a size and factor function, and (3) the current size factor ratio of the fractional number of consecutively arranged ones of said input pixels required to form: one of said output pixels lines, said ratio being at the origin of said lines;

(b) beginning at the start of said input pixel line and sequentially feeding consecutive available pixels therefrom until a current sum at least equal to said current ratio is reached;

(c) feeding a pixel to said output pixel line and finding a new current size factor ratio from said size factor function at that point and finding a current difference between said current sum and said current ratio;

(d) returning to said input pixel line and, starting with the next available pixel, continuing to sequentially feed consecutive available pixels therefrom which are added to said current difference until anew current sum at least equal to said current size factor ratio is reached; and (e) returning to step (c) to continue the process until there are not more available pixels in the input line.

8. A method according to claim 7 wherein said input pixels have intensity levels and, in each case where said fractional number of input pixels are required to form one of said output pixels, corresponding fractions of said intensity levels of said fractional pixels are summed and averaged in such a manner as to provide a desired intensity level for the corresponding one of said output pixels.

9. A method of mapping a digital input image to a viewing screen which is moveable in a 3D coordinate system and wherein said image comprises columns and rows of pixels representing a matrix of pixel intensity values in said system, said system having an observation point on a main axis thereof and viewing screen having a format with columns and rows of pixels extending normal to said axis and spaced from said observation point, said system defining a vertical and horizontal reference plane parallel to said main axis and extending normal to said viewing screen, comprising the steps of:

projecting sequentially and orthogonally said columns of said input image to said vertical reference plane to form first pass object lines in said vertical reference plane;

processing each line of said first pass object lines by projecting divergent lines form said observation point to said each line of said first pass object lines to define an intermediate vertically extending image column line in relation to said viewing screen having equal line segments of a length at least equal to one pixel length, said divergent lines intersecting said each line of said first pass object lines and resulting in corresponding first pass line segments thereof between said divergent lines having respective lengths corresponding to the number of said pixels separating adjacent ones of said divergent lines;

calculating pixel ratios of said first pass line segments relative to corresponding ones of said line segments of said intermediate image column line;

mapping pixels respectively from said first pass line segments to corresponding ones of said line segments of said intermediate image column line;

projecting divergent planes form said observation point through said rows of said viewing screen having a separation of at least one pixel length in said screen, each of said divergent planes intersecting said screen to form a final image row line and intersecting said input image to form a second pass object line;

projecting sequentially and orthogonally said second pass object lines to said horizontal reference plane to form constructional second pass object lines in said horizontal reference plane;

processing each said constructional second pass object line by projecting second pass divergent lines from said observation point through said columns of said screen having a separation of at least one pixel in said screen, said second pass divergent lines intersecting each said constructional second pass object line to form second pass line segments thereof and intersecting said screen to form horizontally extending correctly positioned final image rows, said second pass line segments having respective lengths corresponding to the number of said pixels separating adjacent ones of said second pass divergent lines;

calculating pixel ratios of said second pass line segments relative to corresponding line segments of said final image row; and mapping pixels respectively form said second pass line segments to corresponding line segments of each said final image row.

* * * * *

UNITED STATES PATENT AND TRADEMARK OFFICE
CERTIFICATE OF CORRECTION

PATENT NO. : 4,835,532
DATED : May 30, 1989
INVENTOR(S) : KARL M. FANT

It is certified that error appears in the above-identified patent and that said Letters Patent is hereby corrected as shown below:

Column 31, line 46, cancel "tow" and substitute --two--.

Column 31, line 65, cancel "form" and substitute --from--.

Column 32, line 45, cancel "aid" and substitute --said--.

Column 33, line 18, cancel "one" and substitute --ones--.

Column 36, line 12, cancel "form" and substitute --from-- and line 39, cancel "form" and substitute --from--.

Signed and Sealed this

Second Day of October, 1990

Attest:

HARRY F. MANBECK, JR.

*Attesting Officer*     *Commissioner of Patents and Trademarks*